US011989174B2

(12) United States Patent
Mei et al.

(10) Patent No.: US 11,989,174 B2
(45) Date of Patent: May 21, 2024

(54) SYSTEMS AND METHODS FOR DATA INSIGHT GENERATION AND DISPLAY

(71) Applicant: MicroStrategy Incorporated, Tysons Corner, VA (US)

(72) Inventors: Yingchun Mei, Hangzhou (CN); Xiaodi Zhong, Hangzhou (CN); Jiacheng Li, Hangzhou (CN); Wei Jiang, Hangzhou (CN); Shu Liu, Hangzhou (CN); Lina Zhang, Hangzhou (CN); En Li, Hangzhou (CN)

(73) Assignee: MICROSTRATEGY INCORPORATED, Tysons Corner, VA (US)

( * ) Notice: Subject to any disclaimer, the term of this patent is extended or adjusted under 35 U.S.C. 154(b) by 124 days.

(21) Appl. No.: 17/026,749

(22) Filed: Sep. 21, 2020

(65) Prior Publication Data
US 2021/0240702 A1 Aug. 5, 2021

Related U.S. Application Data

(60) Provisional application No. 62/970,296, filed on Feb. 5, 2020.

(51) Int. Cl.
G06F 16/242 (2019.01)
G06F 16/2455 (2019.01)
G06F 16/2457 (2019.01)
G06N 5/045 (2023.01)
G06N 20/00 (2019.01)

(52) U.S. Cl.
CPC .... *G06F 16/2423* (2019.01); *G06F 16/24564* (2019.01); *G06F 16/24578* (2019.01); *G06N 5/045* (2013.01); *G06N 20/00* (2019.01)

(58) Field of Classification Search
CPC .......... G06F 16/2423; G06F 16/24578; G06F 16/24564; G06N 20/00; G06N 5/045
See application file for complete search history.

(56) References Cited

U.S. PATENT DOCUMENTS

| | | | |
|---|---|---|---|
| 8,311,957 B2 * | 11/2012 | Kirshenbaum | G06N 5/02 706/45 |
| 9,892,168 B1 * | 2/2018 | Apreleva | G06F 16/9535 |
| 2004/0250255 A1 * | 12/2004 | Kraiss | G06F 9/445 719/310 |
| 2006/0184516 A1 * | 8/2006 | Ellis | G06F 16/951 |

(Continued)

OTHER PUBLICATIONS

Google. Mar. 26, 2019. "Google Trends". Google LLC. https://web.archive.org/web/20190326042849/https://trends.google.com/trends/explore?q=%2Fm%2F02vx4,%2Fm%2F0jm_&date=all&geo=US (Year: 2019).*

(Continued)

*Primary Examiner* — Mark D Featherstone
*Assistant Examiner* — Brooks T Hale
(74) *Attorney, Agent, or Firm* — Bookoff McAndrews, PLLC

(57) ABSTRACT

Disclosed herein are systems and methods for intelligent generation and display of insights using information in a data repository. For example, disclosed herein are methods for generating and displaying insights using initial data from a data repository, and intelligently/automatically proposing, generating, and displaying further insights using previously-generated insights.

20 Claims, 22 Drawing Sheets

(56) References Cited

U.S. PATENT DOCUMENTS

| | | | |
|---|---|---|---|
| 2007/0100875 A1* | 5/2007 | Chi | G06Q 30/02 |
| | | | 707/999.102 |
| 2010/0235307 A1* | 9/2010 | Sweeney | G06Q 30/0241 |
| | | | 706/55 |
| 2012/0011077 A1* | 1/2012 | Bhagat | G06Q 10/0635 |
| | | | 705/317 |
| 2017/0267251 A1* | 9/2017 | Roberts | B60W 50/14 |
| 2019/0102438 A1* | 4/2019 | Murray | G06F 16/24573 |
| 2019/0362846 A1* | 11/2019 | Vodencarevic | G16H 50/20 |

OTHER PUBLICATIONS

Google Ads Help, "About Recommendations", Google, https://web.archive.org/web/20190626135341/https://support.google.com/google-ads/answer/3448398?hl=en (Year: 2019).*

Kevin Hakanson, "Global Search Box as Question Answering", https://kevinhakanson.com/2015-06-01-global-search-box-as-question-answering/ (Year: 2015).*

* cited by examiner

SYSTEMS AND METHODS FOR DATA INSIGHT GENERATION AND DISPLAY

CROSS-REFERENCE TO RELATED APPLICATION(S)

This application claims the benefit of priority to U.S. Provisional Application No. 62/970,296, filed Feb. 5, 2020, the entirety of which is incorporated by reference herein.

TECHNICAL FIELD

Embodiments of the present disclosure relate generally to intelligent generation and display of insights using information in a data repository. More particularly, some aspects of the present disclosure relate to generating and displaying insights using initial data from a repository, and intelligently/automatically proposing, generating, and displaying further insights using previously-generated insights.

BACKGROUND

A data repository, such as a database or group of databases, may include a large amount of data which, if analyzed, interpreted, and/or displayed in an informative fashion, may indicate patterns, trends, and information relevant to a user. However, limitations often exist as to the type and quantity of analyses and interpretations which may be presented to a user at any given time. Thus, the most relevant interpretations and analyses may not be apparent in a given display of information. Moreover, the particular relevance of any given interpretation/analysis of data to a user may vary, depending on the user and the user's needs in a specific context.

The present disclosure is directed to overcoming one or more of these above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, systems and methods are disclosed for generating and displaying insights using repository data. In one aspect, a method may include: receiving, at a processor, a request from a user to analyze a metric generated using data from a repository; using a plurality of attributes associated with the data, creating a plurality of analyses of the metric, wherein each analysis of the plurality of analyses is based on at least one attribute; selecting an analysis from the plurality of analyses; generating an insight based on the selected analysis; based on the generated insight and the selected analysis, generating a plurality of recommended actions; outputting, to a user device, a display of the selected analysis, the generated insight, and the plurality of recommended actions; receiving, from the user device, an instruction to take an action in response to the output display; based on the received instruction, generating a further analysis, a further insight, and a plurality of further recommended actions that are based on the further analysis and the further insight; and outputting, to the user device, a display of the further analysis, the further insight, and the plurality of further recommended actions.

In some embodiments, the method may further include recursively performing the steps of: receiving, from the user device, an instruction to take an action in response to the output display; based on the received instruction, generating an additional analysis, an additional insight, and a plurality of additional recommended actions that are based on the further analysis and the further insight; and outputting, to the user device, a display of the additional analysis, the additional insight, and the plurality of additional recommended actions.

In some embodiments the step of outputting, to the user device, the display of the further analysis, the further insight, and the plurality of further recommended actions may include updating a previously output display of the selected analysis, the generated insight, and the plurality of recommended actions. In some embodiments, the received instruction to take an action in response to the output display may include one of a selection of a recommended action, or an instruction input into a user device in spoken or written natural language. In some embodiments, each of the plurality of attributes that describe the data may include a categorization or value assigned to data points in the data, wherein the categorization or value is not reflected in the metric. In some embodiments, the method may further include: using repository data and/or user preference data, training a machine learning model to choose attributes suitable for creating an analysis of a metric; and using the trained machine learning model to choose the plurality of attributes for creating the plurality of analyses of the metric.

In some embodiments, the step of generating a plurality of recommended actions may include: accessing a database of potential recommended actions and conditions for recommending each potential recommended action, wherein the potential recommended actions are assigned a priority order; identifying whether the conditions for recommending each potential recommended action have been met; and selecting a predetermined number of potential recommended actions for which the conditions have been met. In some embodiments, the method may further include receiving, from a user device, an instruction to add a generated insight to a primary visual interface, and adding the generated insight to the primary visual interface. In some embodiments, the method may further include receiving, from a user device, a request to share a generated insight, and creating a copy of the generated insight for attachment to a digital message.

In another aspect, a method of generating and displaying insights using repository data, may include: receiving, at a processor from a user device, a request to analyze a metric generated using data from a repository; using a plurality of attributes that describe the data, creating a plurality of analyses of the metric, wherein each analysis of the plurality of analyses is based on at least one attribute; reviewing the generated analyses to select a predetermined number of analyses, each of which (1) shows an outlier, a pattern, or a trend, or (2) is based on an attribute of interest to a user; generating an insight based on each selected analysis; for each of the generated insights, generating a plurality of recommended actions; outputting, to the user device, an interactive display including each selected analysis, the insight generated based on each selected analysis, and the plurality of recommended actions generated for each insight; receiving, from the user device, an instruction to take an action in response to the interactive display; based on the received instruction, generating a further analysis, a further insight, and a plurality of further recommended actions that are based on the further analysis and the further insight; and outputting, to the user device, an updated interactive display including the further analysis, the further insight, and the plurality of further recommended actions.

In some embodiments, the step of receiving, from the user device, an instruction to take an action in response to the interactive display may include receiving, from a user device, text input by a user, and wherein the method may further include analyzing the text to identify a query or command, and performing an action in response to the query or command. In some embodiments, the action may include one of: generating an additional analysis or insight; comparing two or more analyses; or outputting an answer to a question.

In some embodiments, each generated insight is a summary of a conclusion based on an analysis, and the step of generating an insight based on each selected analysis may include: identifying whether the analysis includes an outlier; identifying whether the analysis exhibits a pattern; or identifying whether the analysis exhibits a trend in data over time. In some embodiments, the method may further include: receiving an instruction to make a prediction based on an analysis; identifying a trend over time exhibited by the analysis; and predicting a future data point using the identified trend over time. In some embodiments, the method may further include: receiving an instruction to output a suggested method for changing a predicted future data point; identifying one or more attributes which, if altered, would change the predicted future data point; and outputting, to the user device, a suggestion to alter the one or more attributes.

In yet another aspect, a system may include one or more processors, and one or more computer-readable media comprising instructions that, when executed by the one or more processors, cause the one or more processors to perform operations for generating and displaying insights using repository data. The operations may include: in response to a user request to analyze a metric generated using data from a repository, identifying a plurality of attributes that describe the data; creating a plurality of analyses of the metric, wherein each analysis of the plurality of analyses is based on at least one attribute; selecting a predetermined number of the created analyses, each of which (1) shows an outlier, a pattern, or a trend, or (2) is based on an attribute of interest to a user; generating an insight based on each selected analysis, wherein the insight summarizes a conclusion based on the analysis; for each generated insight, generating a plurality of recommended actions using the processor, wherein each recommended action includes a recommended further analysis of the selected analysis on which the insight is based; and outputting, to a user device, an interactive display including each selected analysis, the insight generated based on each selected analysis, and the plurality of recommended actions generated for each insight.

In some embodiments, the operations further include: receiving, from the user device, an instruction to take an action in response to the interactive display; based on the received instruction, generating, using the processor, a further analysis, a further insight, and a plurality of further recommended actions that are based on the further analysis and the further insight; and outputting, to the user device, an updated interactive display including the further analysis, the further insight, and the plurality of further recommended actions. In some embodiments, the operation of identifying a plurality of attributes that describe the data is performed by a rules engine using a semantic graph. In some embodiments, the rules engine is located in a network cloud, remotely from the user device. In some embodiments, the operations of selecting a predetermined number of the created analyses and generating an insight based on each selected analysis are performed by a combination of a first insight engine local to a user device and a second insight engine located remotely from the user device.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims. As will be apparent from the embodiments below, an advantage to the disclosed systems and methods is that users may more fully utilize, analyze, and understand repository data in ways that are meaningful and useful to a user in various contexts. Users may also seek out insights (e.g., "drill" into data) and displays thereof, particular to different needs at different times. The disclosed systems and methods discussed below may allow users to intuitively navigate large quantities of data via automatically-generated analyses and insights of the data. Additionally, the disclosed systems and methods may allow for automatic suggestions of ways to effect desirable changes to future data based on current data trends.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIGS. 3F-3L depict further views of an exemplary user interface that may be generated as part of an intelligent data drilling and insight generation process, according to some embodiments.

FIGS. 4A-4F depict views of another exemplary user interface that may be generated as a part of an intelligent data drilling and insight generation process, according to some embodiments.

DETAILED DESCRIPTION OF EMBODIMENTS

Figure 1:
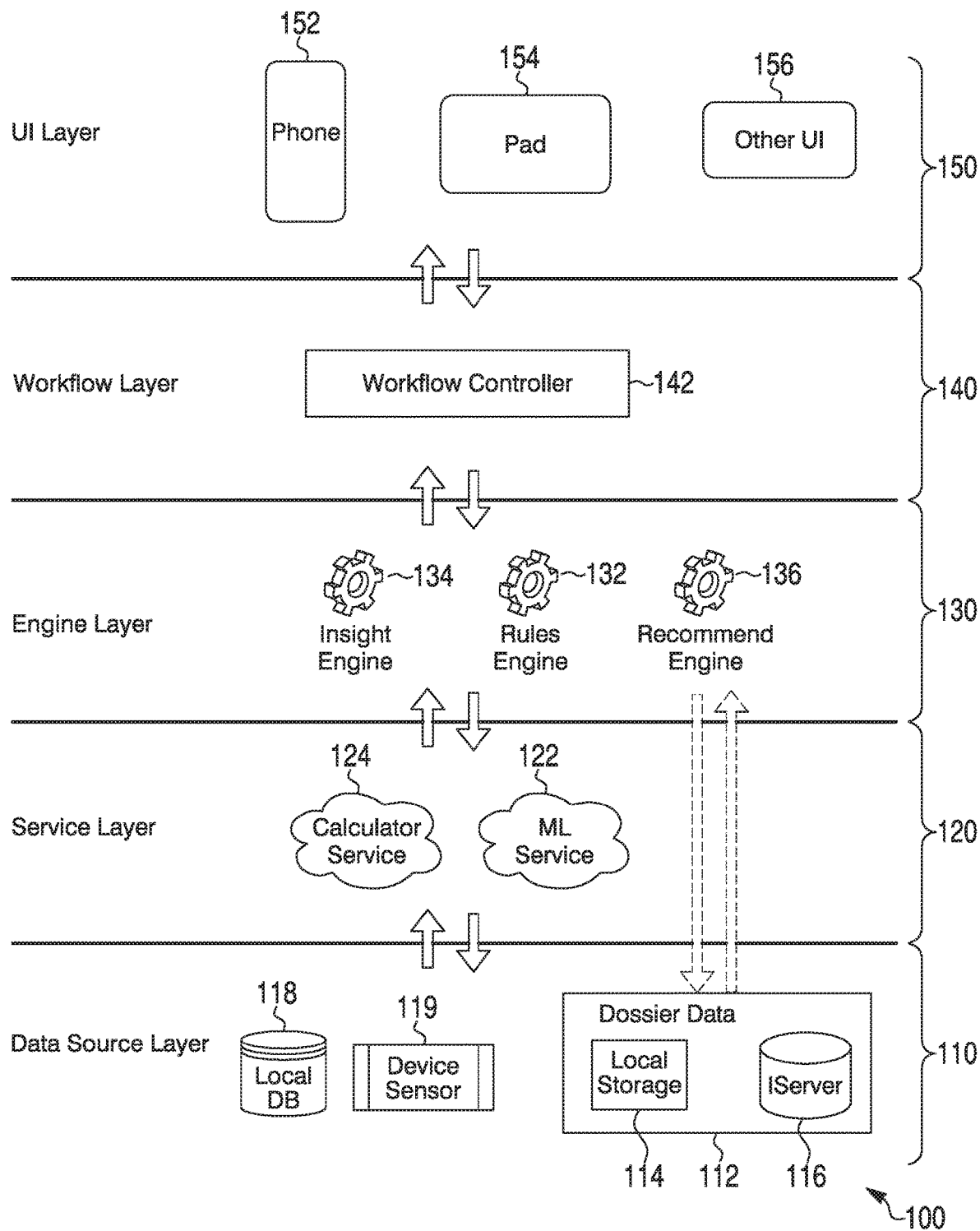
FIG. 1 depicts an exemplary system for intelligent data drilling, insight generation, and display, according to some embodiments.

Various embodiments of the present disclosure relate generally to automatically "drilling" or performing recursive analyses of data in a repository to generate insights based on the data. Additionally, various embodiments of the present disclosure relate to displaying analyses, insights, and recommendations for further analyses and insights to a user in an interactive display that allows for intuitive user interaction on a user device.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

In this disclosure, the term "using" means "using at least in part." The singular forms "a," "an," and "the" include plural referents unless the context dictates otherwise. The term "exemplary" is used in the sense of "example" rather than "ideal." The term "or" is meant to be inclusive and means either, any, several, or all of the listed items. The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as "about," "approximately," "substantially," and "generally," are used to indicate a possible variation of ±10% of a stated or understood value.

The term "data repository" may refer to any data storage system, or combination of storage systems, which house data. A data repository may include one or more of, e.g., a database, a disk drive, or a cloud storage system. In some embodiments, a data repository may include an organized data storage system configured to house data pertaining to an entity, such as an organization or a government. Such an organized data storage system may be configured to be accessed and/or managed by database control, management, and definition languages. In some cases, an organized data storage system which contains data may be referred to as a "dossier."

The term "metric" may refer to a summary or characterization of data values. A metric may be, e.g., a number, a percentage value, a statistic, or other characterization of data. In some embodiments, a metric may have a high level of generality with respect to data in a data repository. For example, a metric may include a summation, combination, averaging, or other general characterization of many data points. A metric may be subject to further analyses based on attributes describing the data underlying the metric.

The term "attribute" may refer to a categorization or a value that describes or provides context to a point, series, or group of data. An attribute may, for example, provide information regarding a source, individual, entity, entity subsection (e.g., a company department or company office), data point type (e.g., a type of action or activity, number type, percentage value, etc.), time (e.g., date, time, season, quarter, etc.), or any other context associated with data. Examples of attributes may include, e.g., a geographic location, an office location, a company department, a survey response, a type of activity (e.g., a marriage, birth, death, crime, financial transaction, etc.). Attributes may be organized into "families" or "hierarchies," containing "parent" and "child" attributes. Child attributes may represent sub-categorizations, subdivisions, etc. of parent attributes. For example, a parent attribute category may include "country name," A child attribute may include "state name," "city name," and the like.

The term "analysis" may refer to an organization of data accompanied by a visualization of the organized data. An analysis may include organization of data according to one or more attributes describing the data being analyzed. For example, an analysis may include a graph, chart, ranked list, map, or other organizational format intended to sort, evaluate, and/or categorize data based upon one, two, or more selected attributes. Attributes may be selected for generating an analysis according to methods described in further detail elsewhere herein.

The term "insight" may refer to a summary of a conclusion or observation that may be drawn from an analysis. An insight may include, for example, a text summary, a pointer, and/or a highlight of some or all of an analysis, and may indicate an outlier, pattern, trend, or other characteristic that may be of interest to a user in an analysis. Insights may be automatically generated based on analyses, as described in further detail elsewhere herein.

Any suitable system infrastructure may be put into place to allow intelligent drilling, analysis generation, insight generation, and recommended actions to further analyze data according to the present disclosure. Several exemplary suitable infrastructures having particular advantages are described herein (in, e.g., FIGS. 1, 5, and 6); however, other configurations of systems may also perform the methods described herein. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," "processor," and the like, are generally used interchangeably herein, and refer to any of the above devices and systems, as well as any data processor.

Aspects of the present disclosure may be embodied in a special purpose computer and/or data processor, or combination of computers and/or data processors, specifically programmed, configured, and/or constructed to perform one or more of the computer-executable instructions explained in detail herein. While aspects of the present disclosure, such as certain functions, may be described as being performed exclusively on a single device, the present disclosure may also be practiced in distributed environments where functions or modules are shared among disparate processing devices linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Specific reference will now be made to the drawings accompanying the disclosure.

FIG. 1 depicts an exemplary system infrastructure 100 which may be used for intelligent data drilling, insight generation, and display, according to some embodiments. As described above, aspects of this system infrastructure may be located in one or more devices, and in one or more geographic locations. Separate devices may be connected via wired or wireless connections (e.g., WAN, LAN, or Internet connections). System infrastructure 100 may include a data source layer 110, a service layer 120, an engine layer 130, a workflow layer 140, and a user interface (UI) layer 150. Adjacent layers in system infrastructure 100 do not necessarily indicate physical adjacency, but rather may indicate interaction between components in the adjacent layers.

Data source layer 110 may include a variety of sources of data, all or part of which may serve as a data repository. Data source layer 110 may include, e.g., dossier data 112, including local storage 114 and a server 116, a local database 118, and a device sensor 119. Dossier data 112 may be identified by other parts of system infrastructure 100 as a data repository, from which data may be principally drawn for analysis and intelligent drilling. Dossier data 112 may include local storage 114, which may be physically located within or adjacent to another component of system infrastructure 100, such as calculator service 124, machine learning (ML) service 122, engines 132, 134, 136, workflow controller 142, or components 152, 154, 156 of UI layer 150. Server 116 may be a single server disposed remotely from other components of system infrastructure 100, or may be a cloud-based "i-server" comprising multiple data storage systems in multiple locations, interconnected by a network. Local database 118 may include information and data local to, e.g., a user device (e.g., one of components 152, 154, 156). Device sensor 119 may include one or more sensors on, e.g., a user device (e.g., one of components 152, 154, 156) which may gather and provide data to other components of system infrastructure 100. Device sensor 119 may be, for example, a GPS locator, a microphone, a keypad input, a motion sensor, or any other component of a device which may receive user input.

Service layer 120 may include components of system infrastructure 100 dedicated to, or capable of, performing particular services to aid in the performance of methods described herein. Service layer 120 may include, e.g., a machine learning service 122 and/or a calculator service 124. Machine learning service 122 may include one or more machine learning models, which may perform parts of methods disclosed herein. Machine learning service 122 may include any suitable machine learning model, such as, e.g., a linear regression model, a decision tree model, a logistic regression model, a random forest model, an Apriori algorithm, a Markov decision process, a Naïve Bayes model, gradient boosting algorithms, or the like. Calculator service 124 may be a processor and/or algorithm configured to perform calculations as part of methods according to the present disclosure. Specifically, calculator service 124 may be configured to perform mathematical calculations (e.g., statistical calculations) necessary to generate insights based on analyses of data.

Engine layer 130 may include one or more processors and/or algorithms configured to manage and perform portions of methods according to the present disclosure. Engine layer 130 may include, e.g., a rules engine 132, an insight engine 134, and/or a recommendation engine 136. Each engine 132, 134, 136 may include one or more processors, and may include the same processors as, or different processors from, each other engine. Rules engine 132 may include, e.g., algorithms configured to select attributes based on a metric and generate analyses of the metric based on the selected attributes. Insight engine 134 may be configured to manage generation of insights based on the generated analyses. Recommendation engine 136 may include algorithms configured to generate one or more recommended actions based on analyses and insights generated by rules engine 132 and insight engine 134.

Workflow layer 140 may include a workflow controller 142. Workflow controller 142 may include one or more processors configured to interface between user interface layer 140 and other layers of system infrastructure 100. Workflow controller 142 may, for example, control generation of, and/or compile, a user interface specific to a user device, and may be configured to integrate analyses, insights, and recommended actions generated by rules engine 132, insight engine 134, and recommendation engine 136 into the user interface of a program, such as a data viewing/data analysis program, running on a user device.

UI layer 150 may include one or more user devices capable of displaying an interactive user interface. For example, UI layer may include a phone 152, a pad (e.g., a tablet) 154, or another user interface device 156, such as a personal computer, smartwatch, alternate reality or virtual reality device, or other device. Phone 152, pad 154, or user interface device 156 may include a device sensor 119, as described elsewhere herein, and may include one or more user input components, such as a keyboard, touchpad, mouse, microphone, and the like.

Figure 2A:
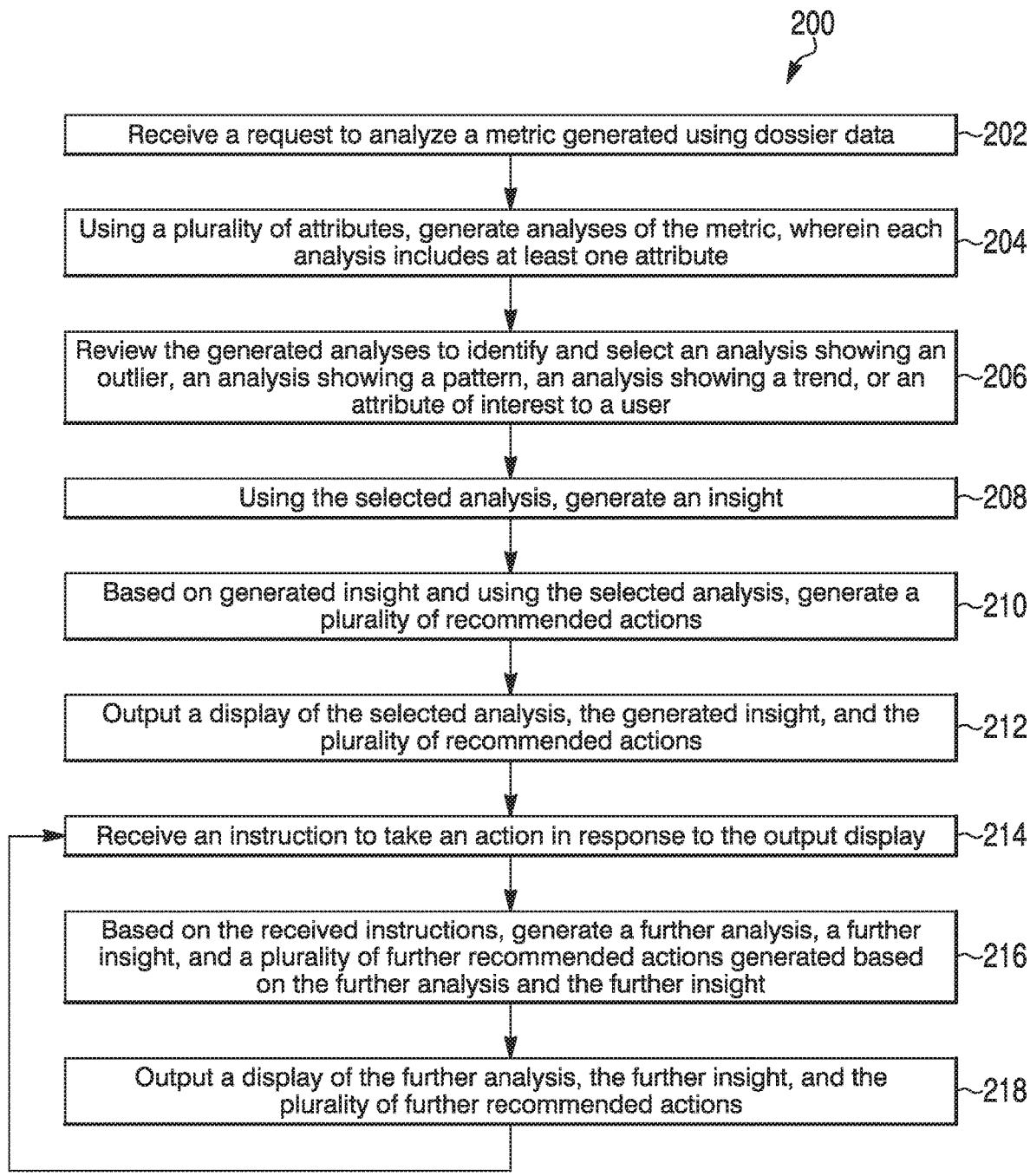
FIG. 2A depicts a flow chart for intelligent data drilling, insight generation, and display, according to some embodiments.

FIG. 2A depicts a flow chart of a method 200 of intelligent data drilling, insight generation, and display. Method 200 may be performed by, e.g., one or more processors in components of system infrastructure 100. In some embodiments, method 200 may commence after a user interface has been provided to a user by, e.g., workflow controller 142, via, e.g., a component of UI layer 150. The user interface may include, e.g., an overview of data from a data repository (e.g., dossier data 112), including one or more metrics. The overview of data may be presented in any given manner. An option to request analysis of the one or more metrics may be provided on the user interface.

While aspects of method 200 are described with respect to, e.g., system infrastructure 100, it is to be understood that this is merely exemplary, and that method 200 may be equally applicable to other system infrastructures similar to or different from system infrastructure 100.

According to step 202, a request may be received to analyze a metric generated using dossier data. The request may be input by a user into a user device (e.g., phone 152, pad 154, or other user interface device 156), and may be transmitted to, e.g., workflow controller 142. For example, a user presented with an overview of data from a data repository may select an option to request analysis of a displayed metric by interacting with a user interface displayed on a user device—e.g., clicking on or touching a button or icon, orally dictating a request for analysis, or typing a written request for analysis. Once the option is selected, the user device may transmit the request to a processor, such as workflow controller 142.

According to step 204, a plurality of attributes may be used to generate analyses of the metric, wherein each analysis uses at least one attribute. This step may be performed by, e.g., a component of engine layer 130 of system infrastructure 100, such as rules engine 132.

Data within the data repository—including data underlying the metric—may be defined or characterized by attributes. As a part of step 204, rules engine 132 may be instructed to identify one or more of the defined attributes that may be of particular use, interest, or relevance in analyzing the metric. For example, workflow controller 142 may instruct rules engine 132 to identify a plurality of attributes for generating analyses of the metric. Rules engine 132 may then generate or otherwise identify a list of attributes for generating analyses. Rules engine 132 may identify attributes for generating analyses of a metric by any of a plurality of methods. In some embodiments, for example, rules engine 132 may access a chart, database, or other data storage containing a list of metric types, and for each metric type, a corresponding list (e.g., a prioritized list) of attributes suitable, or preferable, for generating analyses of the metric type. For example, rules engine 132 may access a semantic graph containing lists of metric types and associated preferred attribute types for performing analyses. In some embodiments, such a semantic graph may reflect, e.g., preferences of an individual user (e.g., the querying user), preferences of multiple users, and/or historically useful or interesting attributes for a given metric.

In some embodiments, a machine learning model (e.g., machine learning service 122) may be trained to identify attributes for generating analyses of a metric, upon query by rules engine 132. In such embodiments, for example, a machine learning model may be trained using data from, e.g., storage local to a user (e.g., local database 118) and/or a data repository (e.g., dossier 112). Data from storage local to a user may reflect, e.g., personal preferences or history as to which attributes are preferentially used in analyses of a given metric. A data repository may include information as to commonly-used attributes, general preferences for attributes of interest relative to a given metric type for the data repository, or other information to assist in identifying attributes for analyses of a metric.

Once trained, the machine learning model (e.g., machine learning service 122) may be queried by, e.g., rules engine 132 to return the identity of one or more attributes to use in analyses of a metric. In some embodiments, the machine learning model may be trained in advance of the commencement of method 200. In other embodiments, the machine learning model may be trained simultaneously with performance of the steps of method 200. Either way, the trained machine learning model (e.g., machine learning service 122) may return, when queried, an identity of one or more attributes suitable for generating analyses of a metric.

Step 204 may also include generation of analyses using the selected attribute(s) by, e.g., rules engine 132. A number of analyses generated according to step 204 may depend on various factors, such as a user preference, a number of selected attributes, and/or the type of attribute(s) selected. As described elsewhere herein, an analysis generally may include an organization of data contributing to a metric according to one or more of the selected attribute(s). In some embodiments, each selected attribute may be associated with a particular type or types of analyses (such associations may be stored, e.g., in a chart, database, or semantic graph, and may be established by prior experience, user preference, etc., or by a trained machine learning model, such as machine learning service 122). To generate an analysis, an analysis type suitable for a selected attribute or set of attributes is selected. A framework for the analysis may be created, and may include, e.g., a chart, graph, image, or the like. Data underlying the metric may be sorted according to the selected attribute or attributes, and may be represented in the analysis framework. Examples of analyses are described further with respect to FIGS. 3C-3E, in the context of the exemplary user interface shown in FIG. 3A.

According to step 206, the generated analyses may be reviewed to identify and select an analysis showing an outlier, an analysis showing a pattern, an analysis showing a trend, or an analysis using an attribute of interest to a user. Analyses showing these characteristics may be prioritized for generation of insights. In some embodiments, as with step 204, step 206 may be performed by, e.g., rules engine 132. In further embodiments, step 206 may be performed by, e.g., insight engine 134. In yet further embodiments, step 206 may be performed by, e.g., a combination of insight engine 134 and rules engine 132. Each generated analysis may be automatically reviewed in a way suited to the analysis, such that outliers, patterns, or trends may be detected. For example, each generated analysis may be automatically subjected to tests for statistically significant trends, patterns, or outliers, depending on the type of data organization employed by the analysis. Additionally, each generated analysis may be reviewed for the use of attributes known to be of interest to a user or other entity (as indicated by information from, e.g., a user device, local database 118, local storage 114, server 116, or another data source). A general purpose of step 206 may be to identify analyses most likely to result in insights that are of use or of interest to a user, either due to data exhibiting notable characteristics (e.g., outliers, trends, patterns, etc.) or due to categories of data known to be of interest.

As an example, in some embodiments, step 206 may include conducting an item analysis on the categorized or organized data in each analysis, to identify/verify outliers. As another example, trends or regressions may be calculated and/or reviewed, and their statistical significance may be determined. Calculator service 124 may be utilized, in some embodiments, to perform certain statistical calculations to this end. In some embodiments, generation of analyses according to step 204 and review of analyses according to step 206 may be performed multiple times until an analysis best showing a possible outlier, pattern, trend, or attribute of interest to a user is developed. Step 206 may include, in some embodiments, selection of a single analysis, and in other embodiments may include selection of multiple analyses. In some embodiments, a particular number of analyses may be selected from which to generate insights, such as two, three, four, or five analyses. In some embodiments, a number of analyses selected from which to generate insights may depend on a number of analyses which show a possible outlier, pattern, trend, or attribute of interest to a user.

According to step 208, once an analysis is selected, the selected analysis may be used to generate an insight. Generation of an insight may be performed by, e.g., insight engine 134. As a part of generating an insight, outliers, patterns, and trends depicted in analyses may be automatically further scrutinized and subjected to, e.g., bounding, filtering, and statistical analyses. Such tasks may be performed by, e.g., calculator service 124.

For example, in an analysis showing an organization of data underlying a metric of unemployment amongst international populations, a given country may be an outlier in showing higher unemployment than other countries. As a part of step 208, the data used in presenting the analysis may be subjected to a filter, such as a Hampel filter, to determine whether the given country is, mathematically speaking, an outlier. the filtration process indicates that the given country is an outlier, then a text description of the outlier may be generated, to summarize this aspect of the data as an insight.

Other examples of reviewing analyses for insights include, e.g., linear regression detection, and trend detection. Linear regression detection may include steps such as, e.g., gradient descent and least square determinations, calculation of a linear regression coefficient, Studentized residuals, removal of outliers, and determination of a Pearson correlation coefficient. Trend detection may include steps such as, e.g., review of a single series of data for a trend over time.

Generation of an insight notably includes generation of a summary of a conclusion that may be drawn with respect to an analysis. Such a summary may be in, e.g., a text format, or may be represented pictographically, audibly, or by any other suitable method. In some embodiments, an insight may be a conclusion with respect to data that is not apparent from an initial observation of the data, Exemplary steps of reviewing analyses for outliers, patterns, trends, and attributes of particular interest, and then of generating insights based on analyses depicting one ore more of these characteristics, is described in further detail with respect to FIG. 2B.

According to step 210, based on the generated insight and using the selected analysis, a plurality of recommended actions may be generated. This step may be performed by, e.g., recommendation engine 136. Various types of recommendations may be stored within, e.g., the data repository of system infrastructure 100. Additionally, according to some embodiments, recommendation types may have a predetermined priority order stored in, e.g., a semantic graph in system infrastructure 100. Recommendation engine 136 may review recommendation types, in order of priority, to determine whether conditions for each recommendation type are met by an analysis/insight. The following table summarizes some exemplary recommendation types, conditions, and relative priorities. It is to be understood, however, that any types of recommended actions, with any conditions for them being proposed, and any relative priorities, may be selected/customized by a user configuring the system infrastructure 100.

TABLE 1

Exemplary Recommended Actions

| Recommendation Language Template | Conditions for Use | Attribute(s) or Element(s) to Recommend | Relative Priority |
|---|---|---|---|
| Check Correlation | Any insight/analysis of one metric using one attribute in which a correlation is shown. | — | Medium |
| Check Distribution | Any insight/analysis of one metric using one attribute in which a distribution of data is shown. | — | Medium |
| Break by <Attribute> | Any insight/analysis of one metric using one attribute having child attributes | Child attribute(s) | High/ Medium |
| Replace with <Attribute> | Any insight/analysis of one metric using two attributes, at least one of which has children. | Child attribute(s) | High/ Medium |
| Analyze <Outlier> | Any insight/analysis using at least one attribute and one metric. | Outlier result detected during analysis/insight generation | High |
| Predict | Any insight/analysis of one metric using a time-related attribute | — | High |
| Explore more | Any insight/analysis of a metric. | — | Low |

The options to "check correlation" and "check distribution," if selected, would prompt review of either a relationship (correlation) or spread (distribution) demonstrated by data in an analysis. Through these recommended actions, perceived correlations and/or distributions may be verified, analyzed for statistical significance, or otherwise further explored. The options to "Break by <Attribute>" and "Replace by <Attribute>", if selected, may prompt generation of new analyses, and potentially new insights, in which data would be broken down into sub-categories or a sub-organization based on a "child" of an attribute used in the original analysis/insight. These options may result in more precise insights once an initial outlier, pattern, or trend is noticed. Similarly, the option to "Analyze <Outlier>" may prompt generation of one or more analyses in which identified outlier data may now be used as a metric, and other attributes characterizing that data may be used to search out insights as to the particular outlier, to determine, e.g., its cause. The option to "Predict" may prompt an analysis in which future data is extrapolated based on a perceived trend. This may be used to interpret trend-related insights into their potential impact on future data. The option to "Explore more" may be used when, e.g., a user does not find any value in pursuing any of the other recommended actions.

According to step 212, a display of the selected analysis, the generated insight, and the plurality of recommended actions may be output. This step may be orchestrated by, e.g., workflow controller 142, which may combine the selected analysis, the generated insight, and the plurality of recommended actions into a user-friendly module for display on a user interface in, e.g., UI layer 150. Any suitable display of the components may be output. In some embodiments, the display that is output may be a full user interface for, e.g., a browser-based program or an app. In further embodiments, step 212 may include simply outputting a display including the selected analysis, the generated insight, and the recommended actions as an addition to an existing user interface on a display. For example, as described with respect to multiple exemplary user interfaces herein, step 212 may include outputting a display as a window to an existing display of data from a data repository. Examples of types of display outputs are described in further detail elsewhere herein.

According to step 214, an instruction may be received to take an action in response to the output display. The instruction may be, for example, input by a user of a user device onto which the display was output. The instruction may include input in any suitable format. For example, the instruction may include a selection (via a click, touch, or other input) of one of the recommended actions that were output to the display according to step 212. As another example, the instruction may include a typed instruction in natural language, a dictated instruction received via a microphone, or any other type of input instruction. In the case of a typed or dictated instruction, or an instruction that otherwise requires interpretation, then the instruction may be interpreted by, e.g., a processor running a natural language processing program.

The instruction may, in some embodiments, direct further analysis, or "drilling down," on a previously-output insight and analysis. For example, the instruction may include any of the recommended actions listed in Table 1, most of which include scrutinizing or further breaking down an existing insight. In some embodiments, it is contemplated that analyses and insights that are displayed may not necessarily reveal information valuable to a user. In such cases, an instruction such as "Explore more" may be received, indicating that additional exploratory analyses and insights should be generated.

It is also contemplated that a user may not wish to limit themselves to recommended actions, but may instead wish to submit another query or instruction. The user may type or otherwise input a command or question in natural language that does not specifically result in "drilling down" for more information. For example, step 214 may include receiving an instruction such as "Save insight," "Share," "View more," or "Analyze <attribute>." in such cases, a natural language processor may be used to interpret the query or command into a format that can be understood by, e.g., the workflow processor or other components of system infrastructure 100.

According to step 216, based on the received instructions, a further analysis, a further insight, and a plurality of further recommended actions generated based on the further analysis and further insight may be generated. These steps may be completed in much the same fashion as steps 204-210 described above.

According to step 218, a display of the further analysis, the further insight, and the plurality of further recommended actions may be output, in much the same way as a display was output according to step 212. The display of the further analysis may either replace the display output according to step 212, or alternately may be added to it. Exemplary output displays according to the present disclosure are described in further detail elsewhere herein.

Steps 214 through 218 may be repeated recursively. For example, once a display is output according to step 218, a user viewing the output display on a user device may input a further instruction to take another action in response to the output display. The action may be based on the further analysis, the further insight, and/or the plurality of further recommended actions output according to step 218. As such, in repeating steps 214, 216, and 218, additional analyses, insights, and recommended actions may be generated based on previously-generated analyses, insights, and/or recommended actions, resulting in a "drill" of insights and analyses on characteristics of data of interest.

Figure 2B:
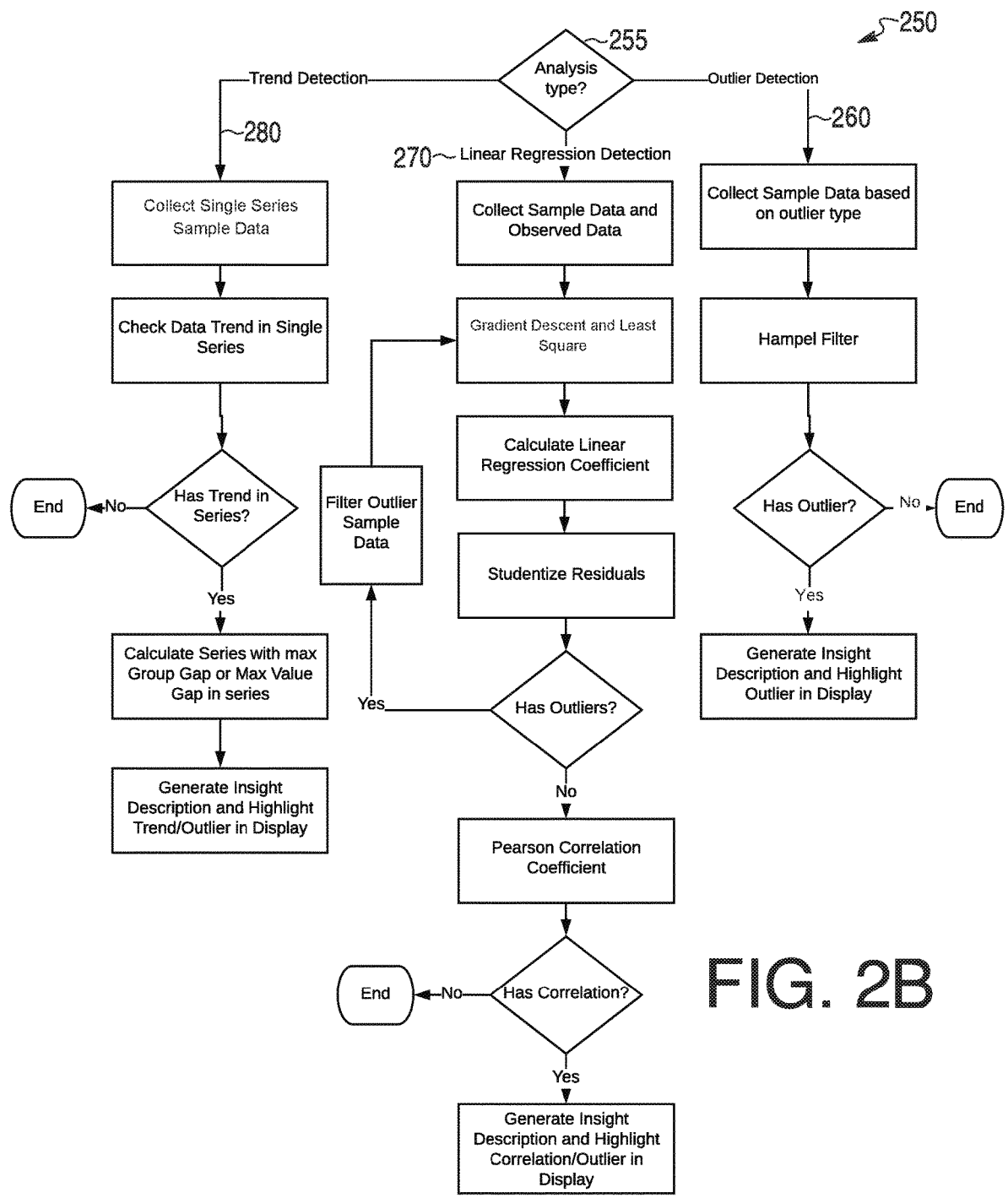
FIG. 2B depicts a flow chart of exemplary methods for generating insights based on analyses, according to some embodiments.

FIG. 2B depicts a flow chart of an exemplary method 250 of generating insights for analyses, consistent with steps 206 and 208 (and step 216) described above. The depicted flow chart is merely an example of a particular method by which insights may be generated, and many variations on this flow chart are possible.

The method of FIG. 2B begins with an identification of the type of analysis for which an insight may be generated (step 255). If an analysis is indicative of an outlier, for example, then the method may proceed as indicated through the "Outlier Detection" path (path 260). Sample data may be collected based on the type of outlier in the analysis. By this, it is meant that data underlying an analysis indicative of an outlier, and specific to the outlier in the analysis, may be identified and/or collected from, e.g., a dossier or other data repository. A filter, such as a Hampel filter, may be applied to the collected data to verify the presence of an outlier. If no outlier is verified, then this branch does not result in generation of an insight. However, if an outlier is verified, then an insight description (e.g., a textual description) may be generated, and in the output display of the analysis and the insight, the outlier may be highlighted to match the insight (e.g., by a different color point or bar on a chart, by bolding, or by other means).

If an analysis is indicative that a pattern or correlation may be seen in the data represented therein, then the method may proceed as indicated through the 'Linear Regression Detection" path, which employs linear regression tools to determine the existence and/or extent of correlation between data (path 270). Sample data and observed data (i.e., data between which there may be a correlation) may be collected. A gradient descent or least square may be calculated, and a linear regression coefficient may be determined. Studentized residuals may also be calculated. If outliers are detected in the data, then they are filtered, and the remaining data is again subjected to calculation of gradient descent or least square, and linear regression coefficient. If no outliers are detected, then a Pearson correlation coefficient is calculated. If the Pearson correlation coefficient is indicative of a correlation between the sample and observed data, then an insight description may be generated, and in the output display of the analysis and the insight, an indication or highlight of the linear regression analysis may be added (e.g., by depiction of the line, by an added chart showing the line, by indication of the Pearson correlation coefficient, or by other means).

If an analysis is indicative of a trend over time, then the method may proceed as indicated through the "Trend Detection" path (path 280). Sample data may be collected for a single series spanning a period of time. The data for the single series may be checked for a trend using any suitable method, such as algorithmic review for systemic patterns. If no trend is detected, then this branch does not result in generation of an insight. However, if a trend is detected, then a series may be calculated, the sample data may be iterated along a time period, a gap value between two temporally adjacent points of sample data or groups of sample data may be calculated, and a maximum gap value between groups or maximum gap value between points may be found. An insight description (e.g., a textual description) may be generated, and in the output display of the analysis and the insight, the trend may be indicated to match the insight (e.g., by a line or graph depicting the trend, or by other means).

It is contemplated that various branches of an insight generation process flow may have different priorities, depending on, e.g., user preference or system configuration. For example, in the method of FIG. 2B, for an analysis which may exhibit both an outlier and a pattern that may be suited to linear regression, the "Outlier Detection" path may be prioritized. If an insight is generated based on the "Outlier Detection" path, then further insights for the same analysis may not, in some embodiments, be generated based on, e.g., the "Linear Regression Detection" path.

Reference will now be made to exemplary user interface displays, portions thereof, and data represented therein. While the specific views provided are exemplary, the figures depict features which may advantageously guide a user towards valuable insights and productive analyses of information in a data repository.

Figure 3A:
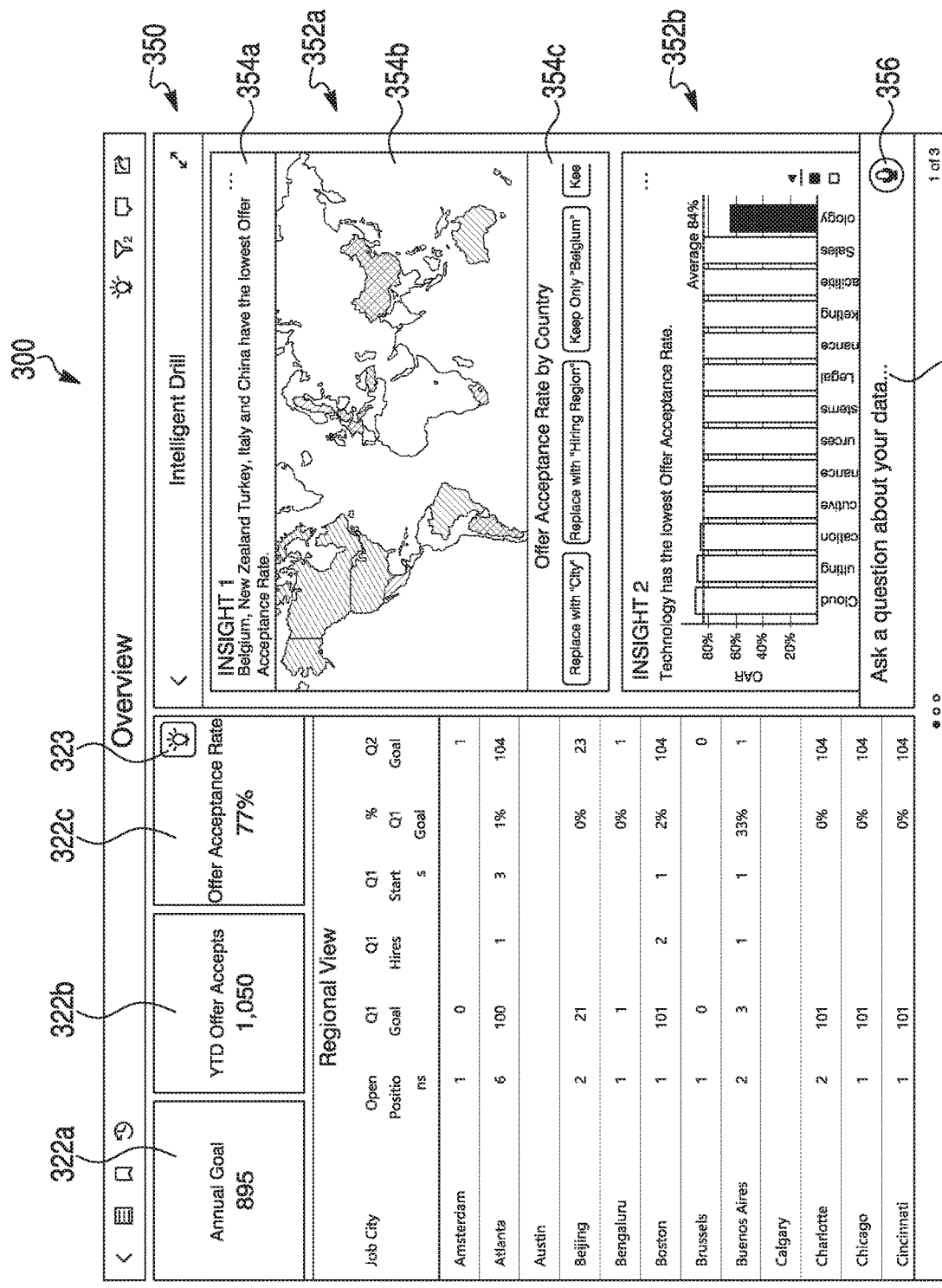
FIGS. 3A and 3B depict views of an exemplary user interface that may be generated as a part of an intelligent data drilling and insight generation process, according to some embodiments.

FIG. 3A depicts a view of an exemplary user interface 300 that may be generated as a part of an exemplary intelligent data drilling and insight generation process. User interface 300 may include a "primary" visual interface 320, which may include displays and depictions of information and data presented prior to generation of insights, according to the present disclosure. Primary visual interface 320 may include a plurality of metrics 322*a*, 322*b*, 322*c*. A selectable icon 323, when selected, may allow the "intelligent drill" interface 350 to open, as shown. Intelligent drill interface 350 may include an interactive display of analyses, insights, and/or recommended actions generated according to methods of the present disclosure. As depicted, when intelligent drill interface 350 opens, it may be co-displayed with primary visual interface 320, to allow a user to see and manipulate both parts of user interface 300 at the same time.

A plurality of insight displays 352*a*, 352*b* may populate intelligent drill interface 350. Each insight display (as shown for insight display 352*a*) may include an insight 354*a*, an analysis display 354*b*, and a recommendations display 354*c*. Intelligent drill interface 350 may also include a text input field 355 and a microphone input trigger 356, which, when activated, may allow for speech-to-text population of text input field 355.

Figure 3B:
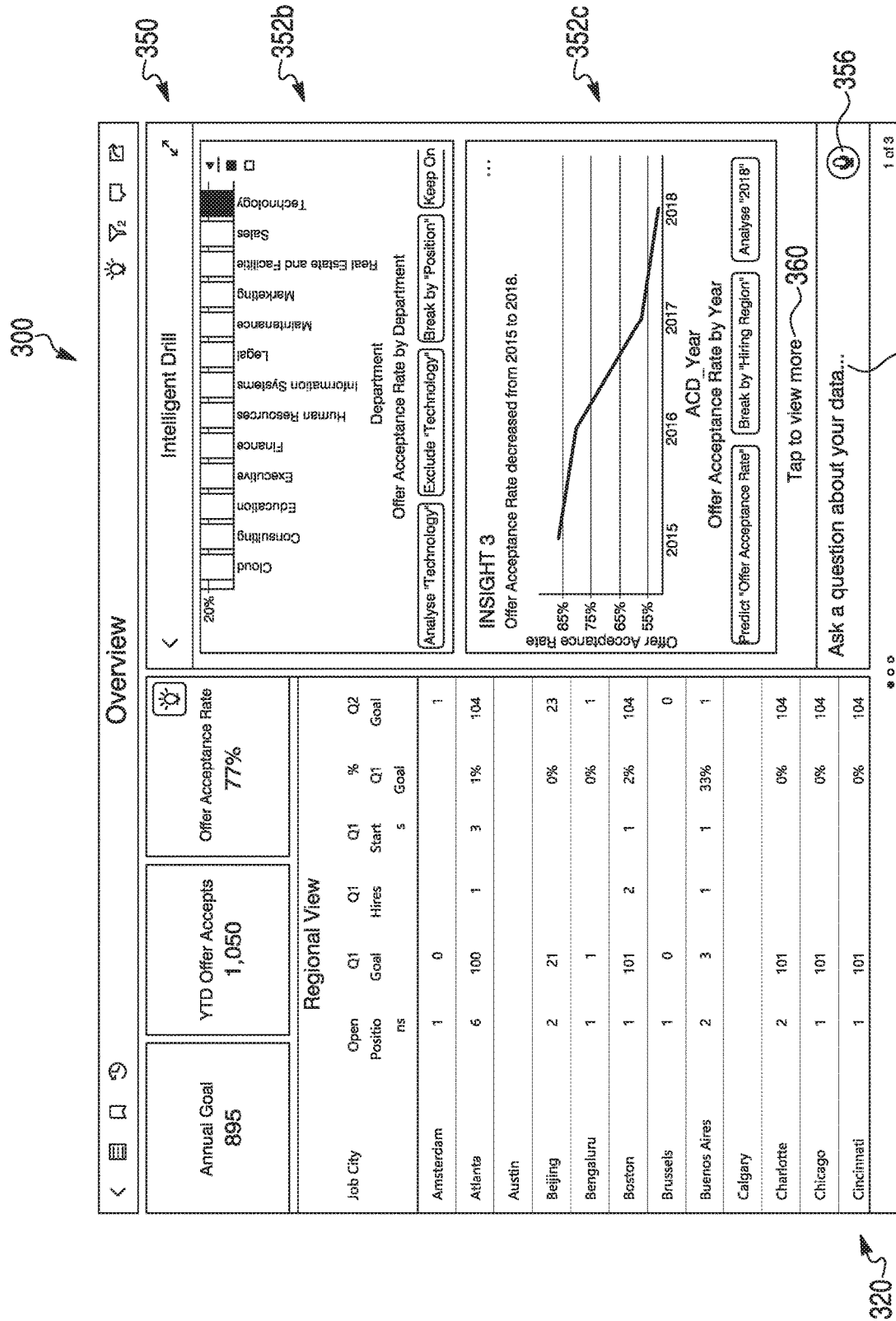

It is contemplated that portions of user interface 300 may be manipulable (e.g., slidable, expandable, contractible, and able to be switched around). Moreover, each of primary visual interface 320 and intelligent drill interface 350 may be independently scrollable. FIG. 3B depicts a further view of user interface 300, in which intelligent drill interface 350 has been scrolled to show a portion of insight display 352*b* and an insight display 352*c*. After a predetermined number of insight displays, intelligent drill interface 350 may provide a prompt 360, which a user may select to convey an instruction to the system that they wish to view more insight displays.

Figures 3C, 3D, 3E:
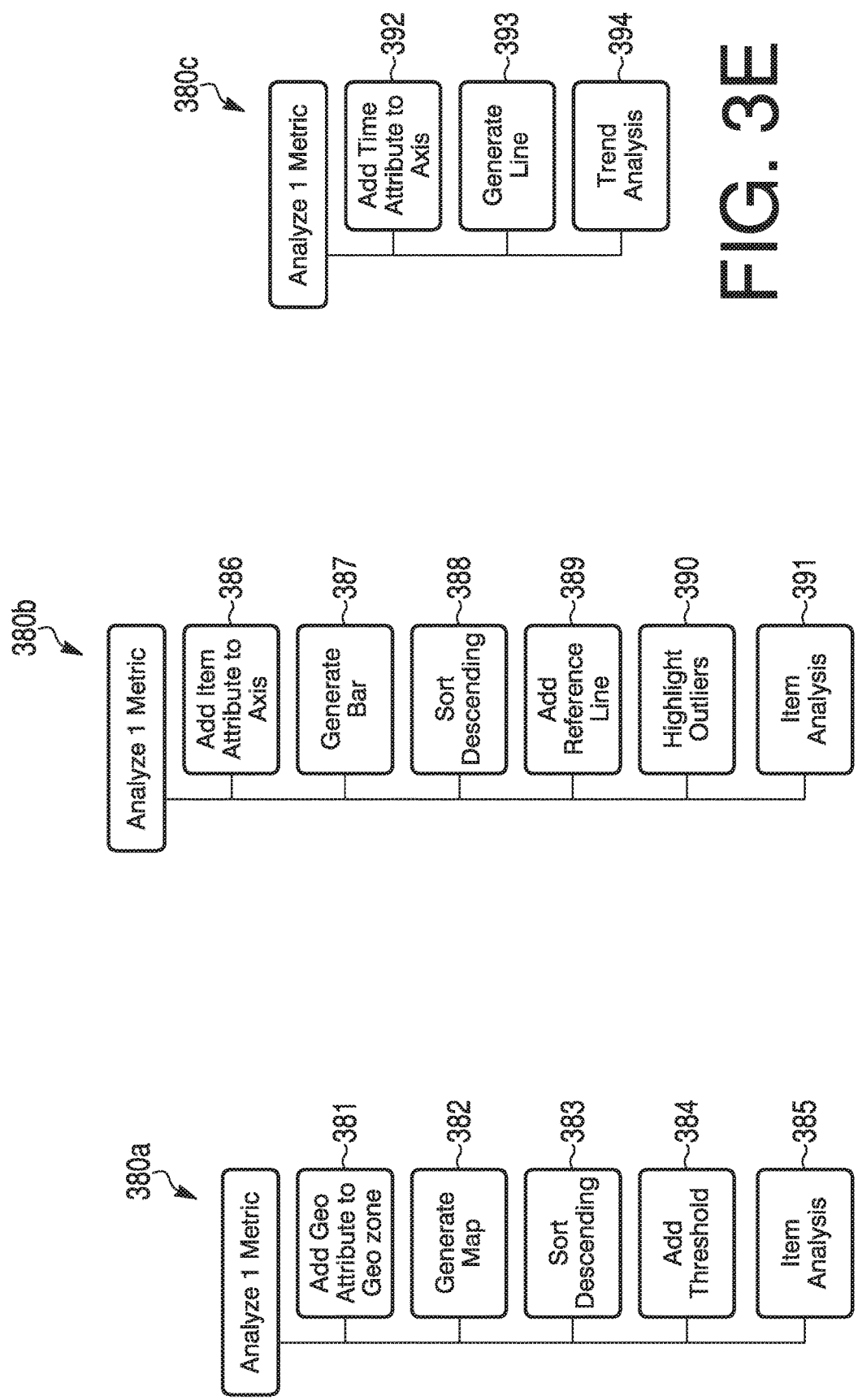
FIGS. 3C-3E depict flow charts for generating analyses of metrics, according to some embodiments.

FIGS. 3C-3E depict flow charts of exemplary methods for generating analyses of metrics displayed in insight displays 352*a*, 352*b*, 352*c*, by way of explaining the contents of those insight displays. The steps depicted in these methods may correlate with, e.g., step 206 of method 200. In particular, "offer acceptance" or "offer acceptance rate" may be an attribute of interest to a user utilizing intelligent drill interface 350. Method 380*a* of generating an analysis for insight display 352*a* includes adding a geographic attribute (e.g., a color or a value) to a geographic zone on a map for every data point (e.g., every offer acceptance) attributable to that geographic zone (step 381), generating a visual map (step 382), sorting the data in descending order based on the different geographic zones (step 383), adding an upper and/or lower threshold (step 384), and conducting an item analysis to identify a potential insight relevant to an attribute of interest to a user (step 385).

Method 380*b* of generating an analysis for insight display 352*b* includes creation of a bar graph and representing attribute categories on an x-axis (step 386), where attribute categories in this case included departments of an organization, generating a bar graph using the data points (step 387), sorting the bars in descending order (step 388), adding a reference line (step 389) to show, in this case, an average offer acceptance rate across all attribute categories, highlighting outliers (step 390), which in this case includes a low number of offer acceptances in the Technology department, and conducting an item analysis to identify a potential insight of interest for a user (step 391).

Method 380*c* of generating an analysis for insight display 352*c* includes creation of a trend analysis over a time period. The method includes creating a graph and representing time on one axis (step 392), generating a line using a series of data points over the course of the time period depicted on the axis (step 393), and conducting a trend analysis to identify any potential insight of interest for a user (step 394).

Figure 3F:
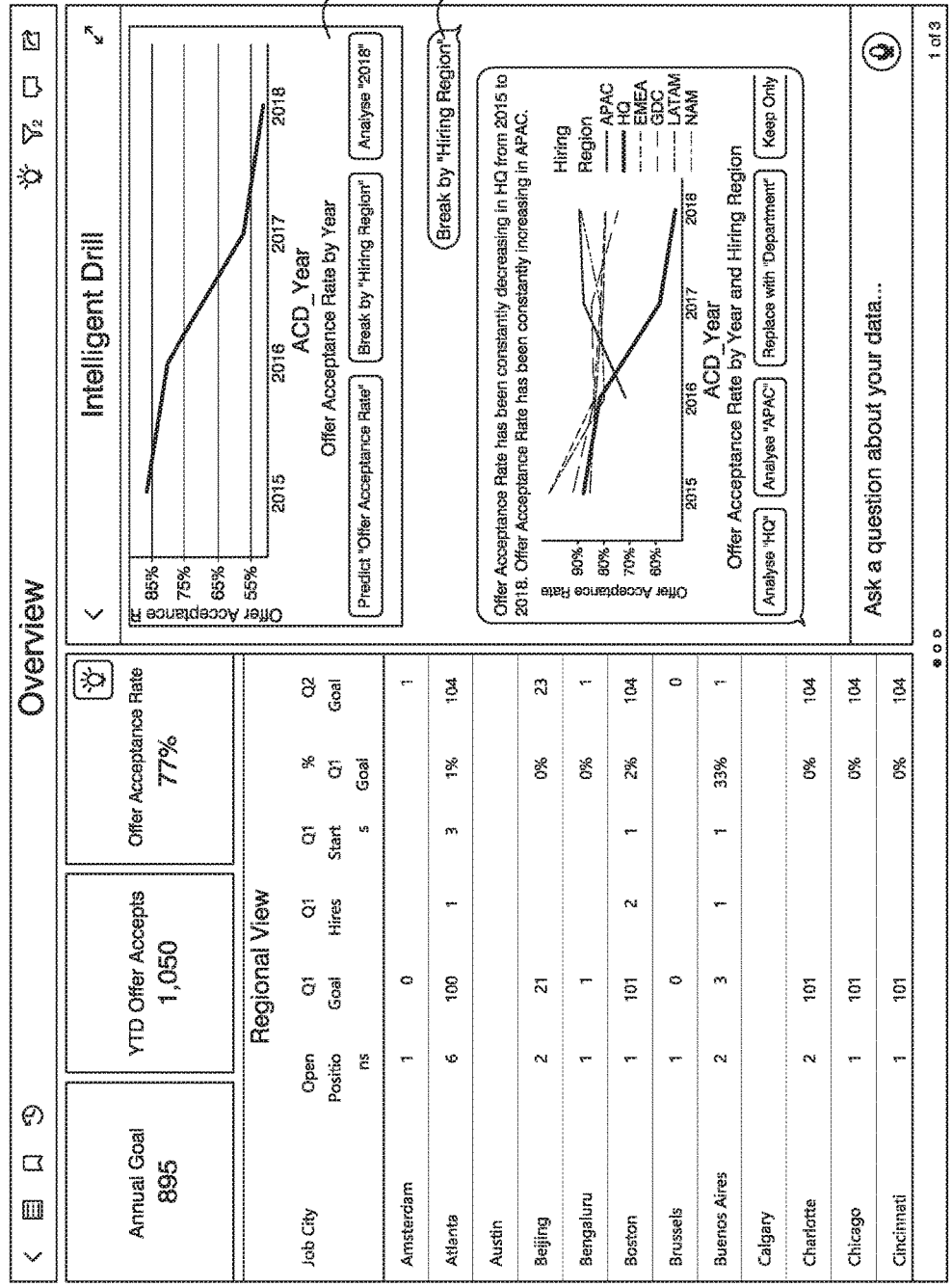

FIGS. 3F-3L depict additional views of user interface 300 and, in particular, intelligent drill interface 350, at further points in an intelligent data drilling and insight generation process. FIG. 3F depicts, for example, an instruction 402 conveyed to a system for insight generation. As can be seen, the instruction corresponds to a recommended action in insight display 354*c*. Following posting of the instruction, a fourth insight display 352*d* is added, in which the previously-presented trend analysis in insight display 352*c* is re-analyzed with respect to multiple different hiring regions. In other words, an initial insight display 352*c* depict a trend analysis of an insight (offer acceptance rate over time), and a following insight display 352*d*, according to user instructions, shows a trend analysis of offer acceptance rate over time by hiring region, i.e., an exploration or "drill" into the office acceptance rate trend depicted in insight display 354*c*.

Figure 3G:
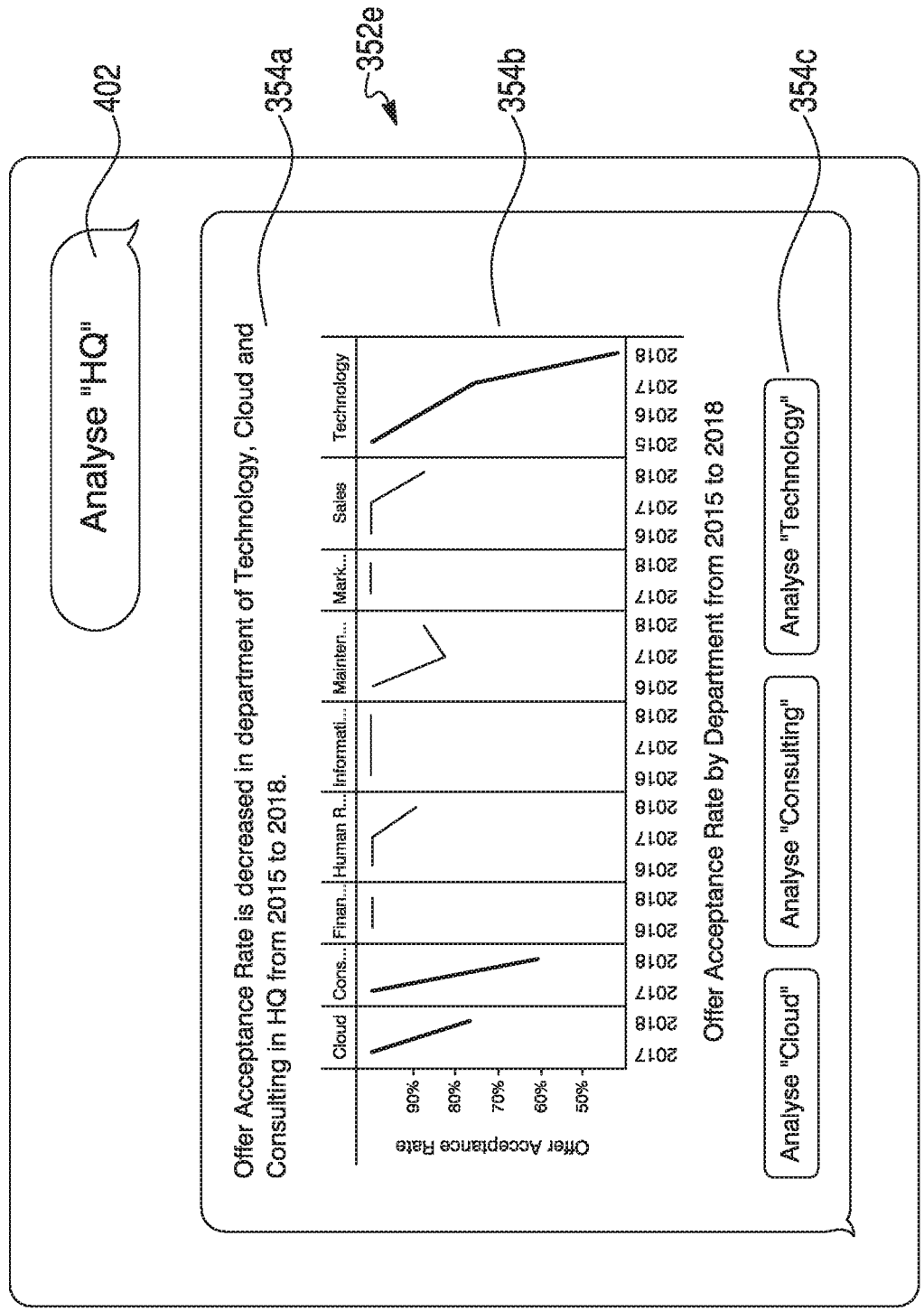

FIG. 3G depicts a partial view of intelligent drill display 350. A further instruction 402, "Analyze 'HQ'," is provided, in response to which a further insight display 352*e* is displayed. Insight display 352*e*, as with each other insight display, includes an insight 354*a*, an analysis 354*b*, and a plurality of recommended actions 354*c*.

Figure 3H:
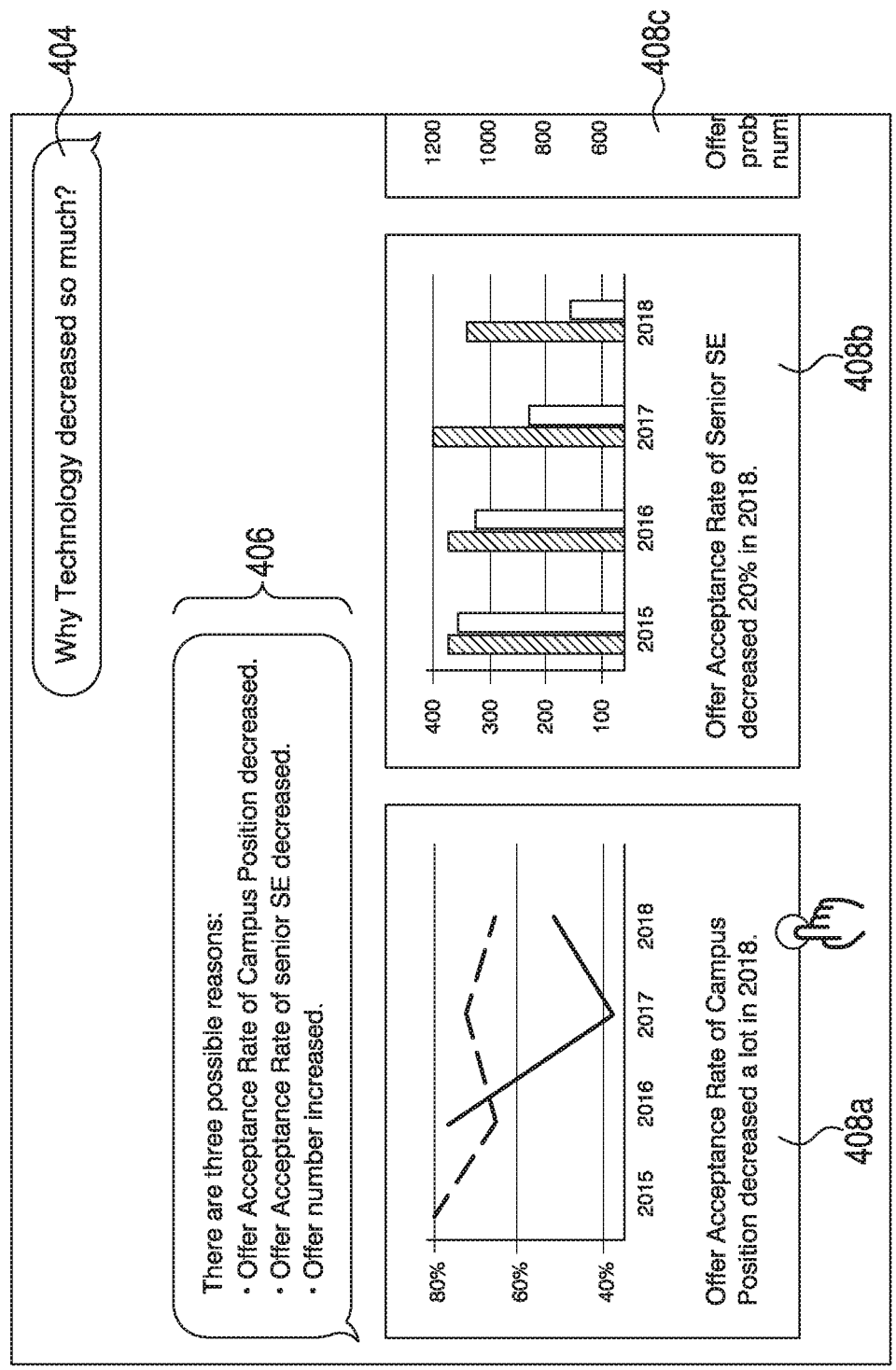

FIG. 3H depicts another partial view of intelligent drill display 350. In this view, a question 404 is posed via intelligent drill interface 350 in natural language. In response, intelligent drill display 350 posts a response 406 to the question, in which potential answers or clarity are offered. Each potential answer is accompanied by an analysis visualization 408*a*, 408*b*, 408*c*. By selecting a visualization 408*a*, a user may instruct the system to convert visualization 408*a* into a portion of a full insight display 352*f* (see FIG. 3I).

Figure 3I:
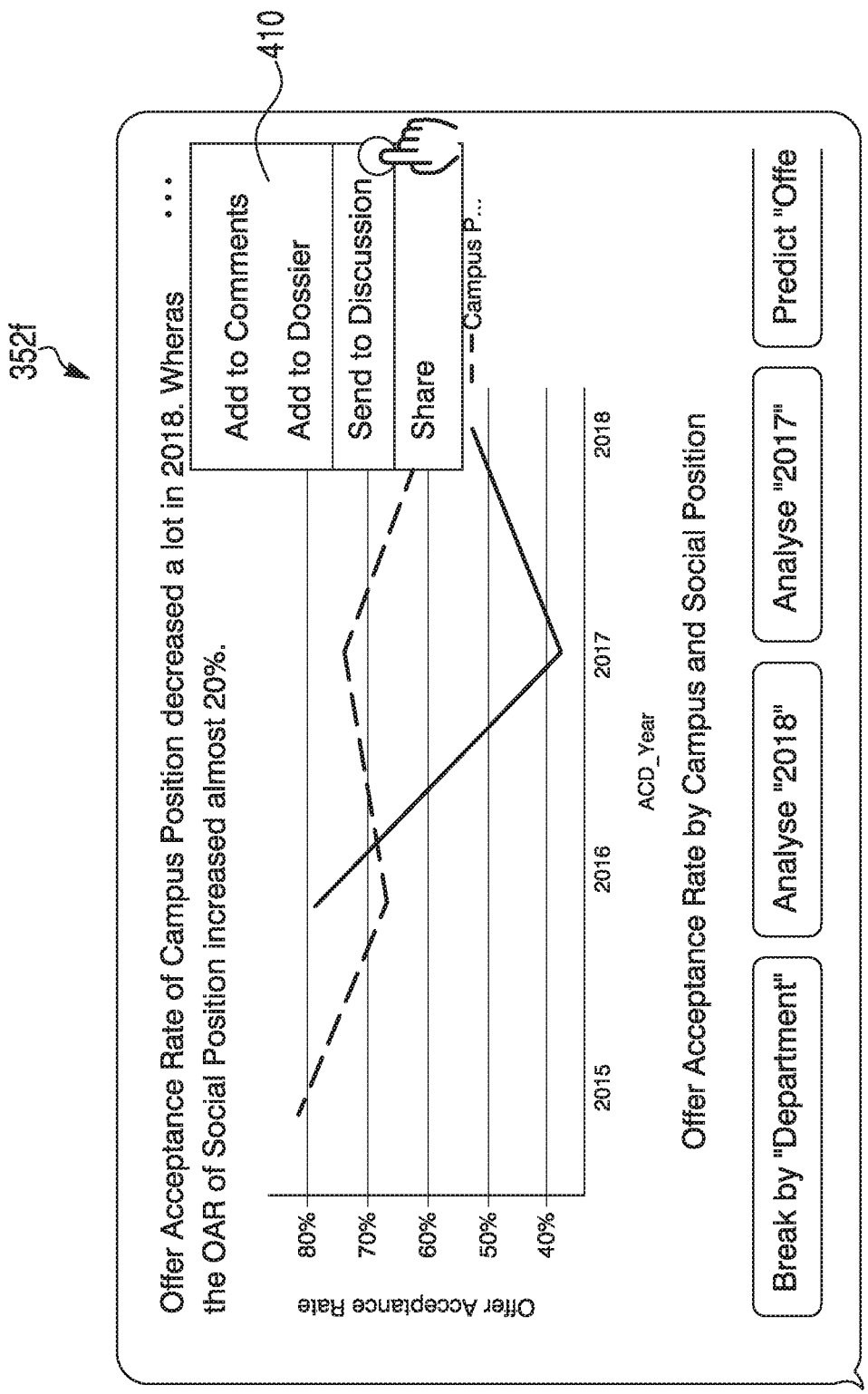
Figure 3J:
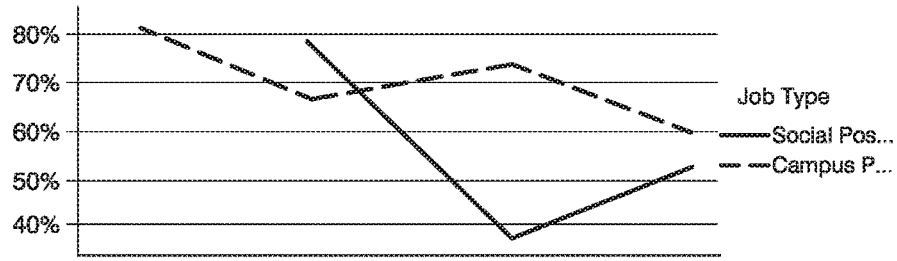
Figure 3K:
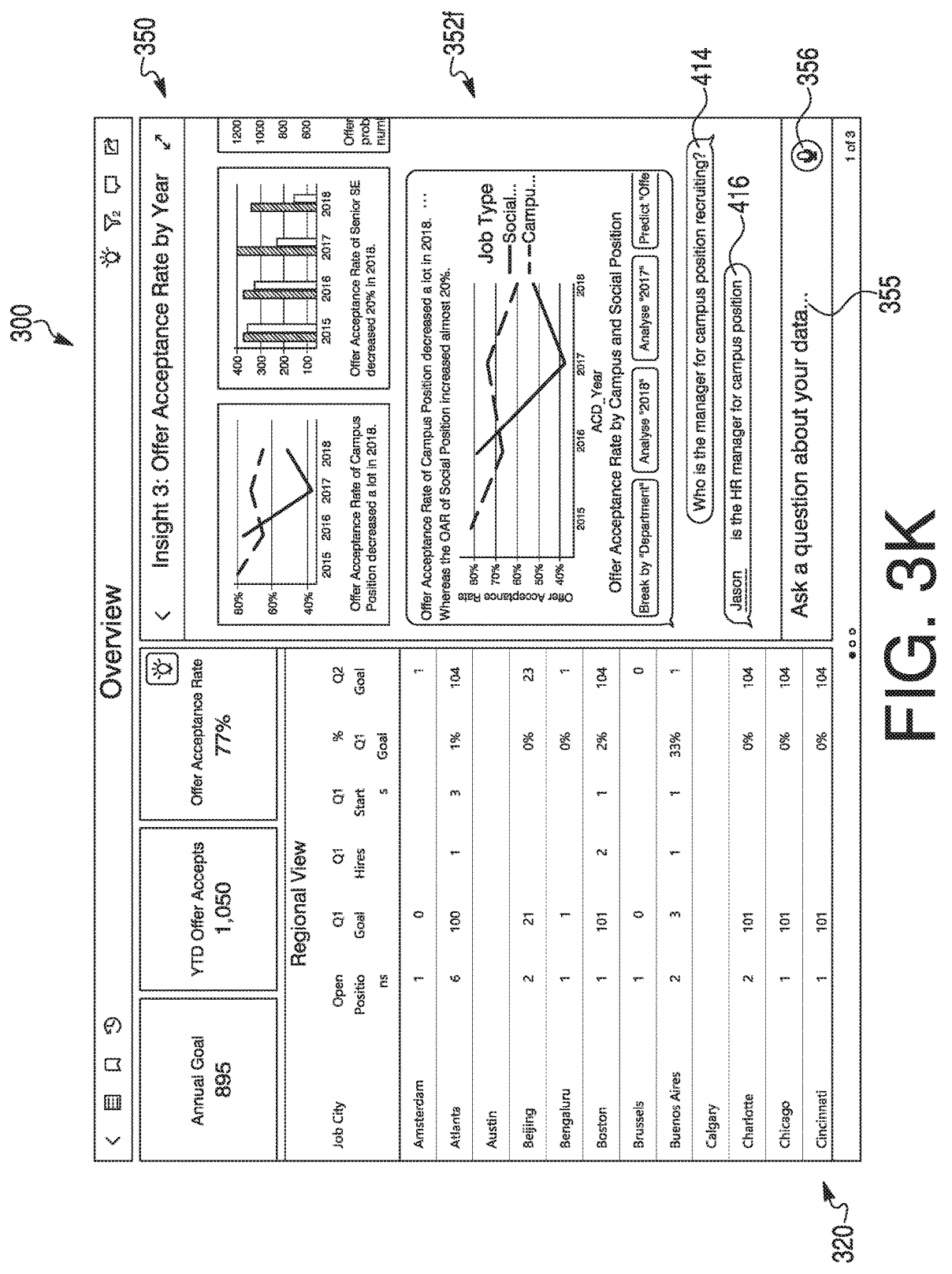

As depicted in FIG. 3I, an option menu 410 may be made available (e.g., via a long tap, a click-and-hold, or other cue on a user device), through which an insight display (e.g., insight display 352*f*) may be added or sent to a variety of places, such as comments, dossier, a discussion, etc. As depicted in FIG. 3J, once an option to send an insight display to a discussion (e.g., insight display 352*f*) is selected, a variety of options may be provided. Insight display 352*f* may be provided within a messaging window, and access may be granted to an address book or other means of identifying recipients for the insight display. Text may be appended to the message, e.g., to provide context, a greeting, notes, or any other additional content.

FIG. 3K is again a more complete view of user interface 300, concurrent with FIG. 3I. As shown, intelligent drill display 320 may continue to populate with analyses, answers to questions, or the like. A natural language question 414 may be asked, regarding information not strictly for show in an insight display. According to systems and methods of the present disclosure, natural language processor(s) may be provided to interpret the question and, if possible, provide an answer. In this case, an answer 416 is provided, based on information pulled from, e.g., a data repository, a mail program, or the like.

Figure 3L:
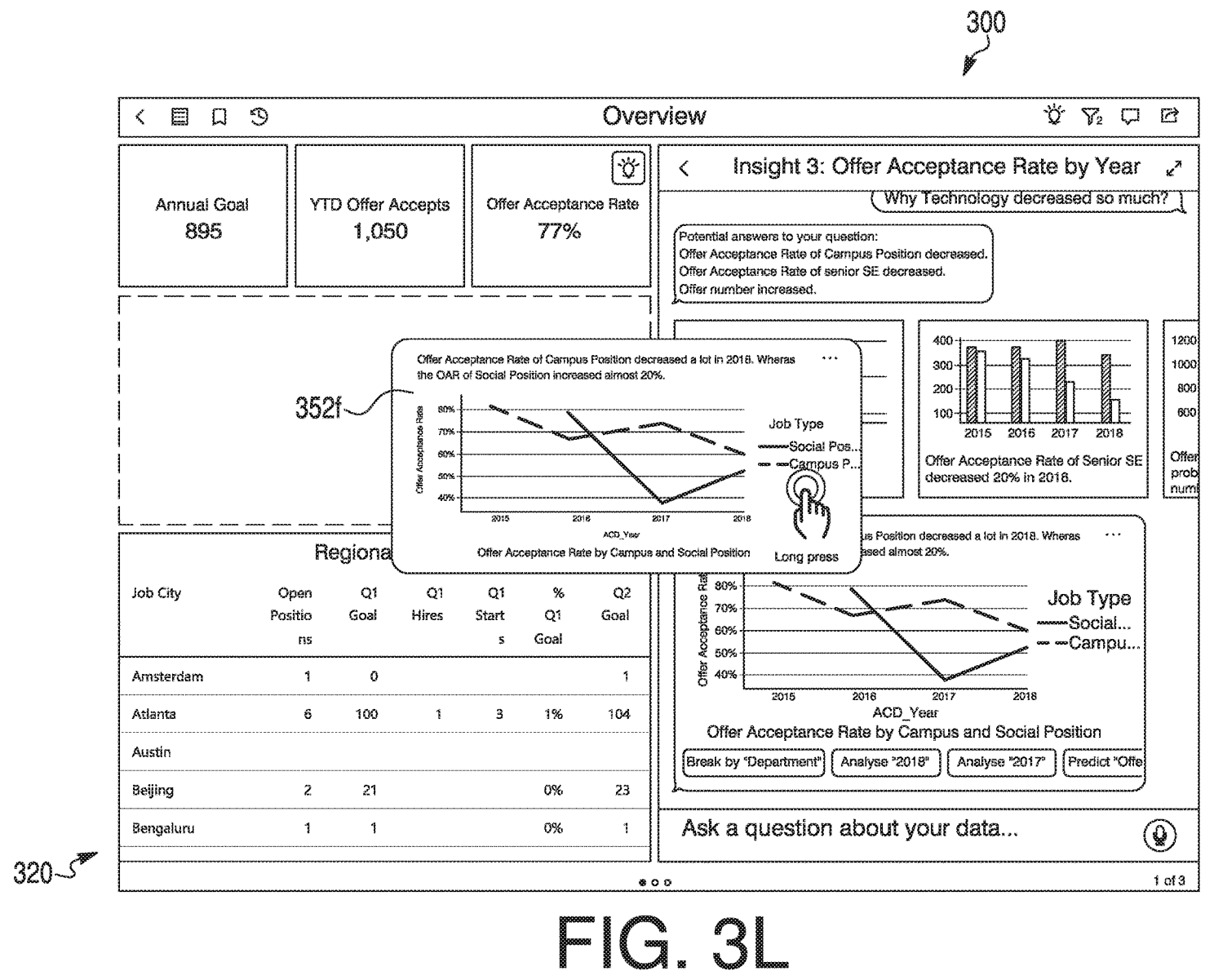

A further functionality of user interface 300 is shown in FIG. 3L. Should a user wish to drag and drop an insight display (e.g., insight display 352*f*) into primary visual interface 320, they may do so. Both primary visual interface 320 and intelligent drill display 350 may adjust to accommodate the movement of insight display 352*f* from one side of user interface 300 to another. As previously described, various aspects of user interface 300 may be similarly moveable, changeable, and customizable.

FIGS. 4A-4F depict views of another exemplary user interface 400 that may be generated as a part of another exemplary intelligent data drilling and insight generation process. User interface 400 includes a primary visual interface 420, which displays a plurality of metrics 422a, 422b. A hovering trigger panel 423 may become available on a metric 422a or 422b upon initial highlighting or selection of metric 422a or 422b, trigger panel 423 providing access to an intelligent drill interface 450. Intelligent drill interface 450 occupies a right-hand part of user interface 400 once opened. If intelligent drill interface 450 is open, and a metric 422a or 422b is highlighted or selected and its corresponding trigger panel 423 is selected, then intelligent drill interface 450 may update to display information relevant to the most recently highlighted or selected metric. Again, as with user interface 300, the exact configuration of user interface 400 is exemplary. Many variations are possible. Additionally, parts of user interface 400 may be movable, changeable, and resizeable.

Intelligent drill interface includes, e.g., a text input field 455 and a microphone trigger 456. A header bar of intelligent drill interface 450 may include a variety of triggers to perform functions designed to provide augmented data discovery functionality. Such triggers may instruct an intelligent drill system to, e.g., generate/fetch additional analyses, insights, and/or recommendations; save an insight display as a favorite, expand intelligent drill interface 450 to fill the screen, etc.

Depicted in intelligent drill interface 450 is an insight display 452a. As compared to insight displays depicted in FIGS. 3A-3L, insight display 452a includes additional detail. For example, insight display includes "key influencer" identification 453a, 453b, 453c, which may provide added context to an initial analysis without direction from a user. Such added context may be generated by, e.g., a system infrastructure recursively performing the steps of data analysis, insight generation, recommendation generation, and display (e.g., steps 214-216 of method 200) without the need for human direction, to a given extent.

Figure 4A:
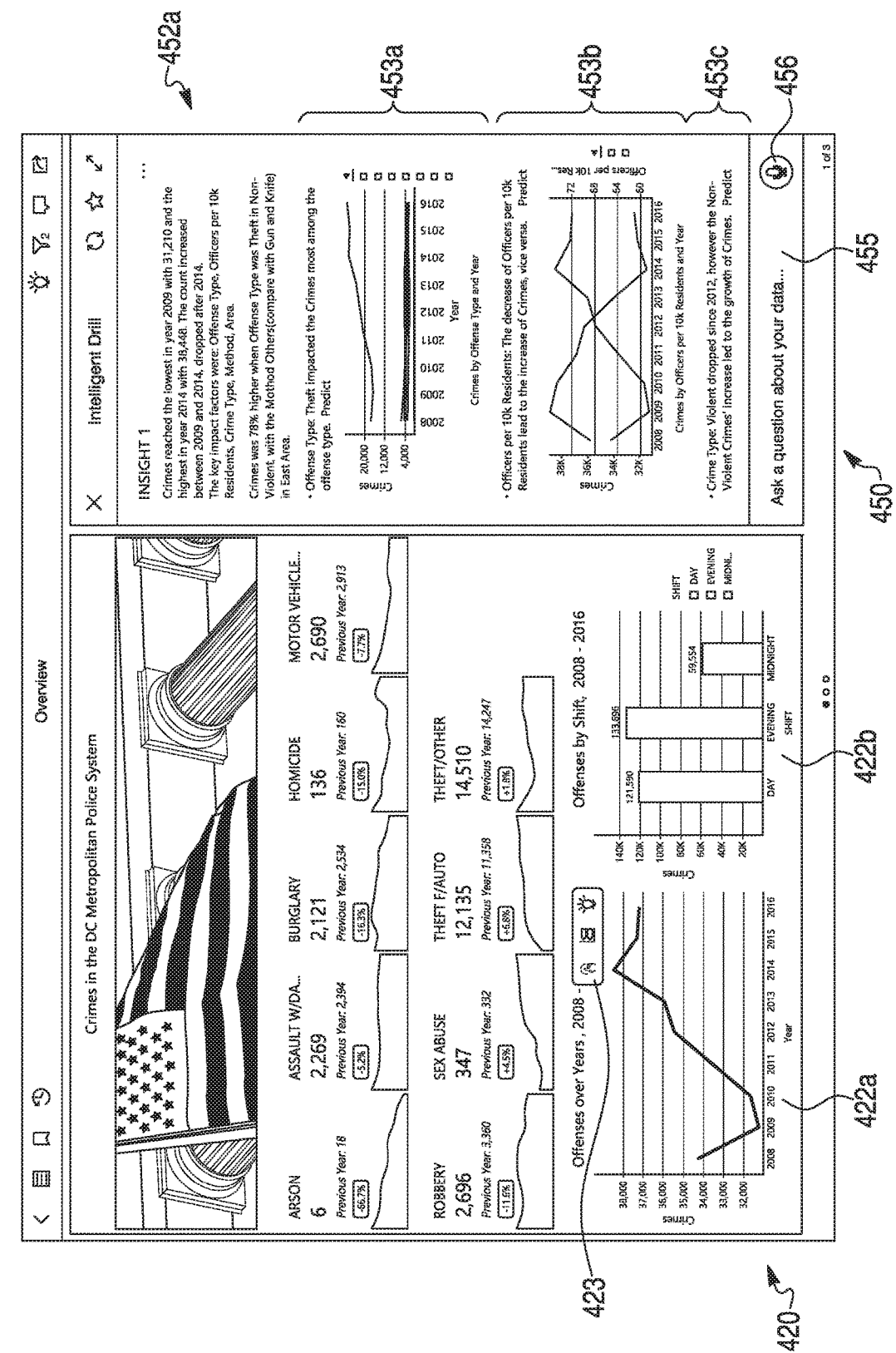
Figure 4B:
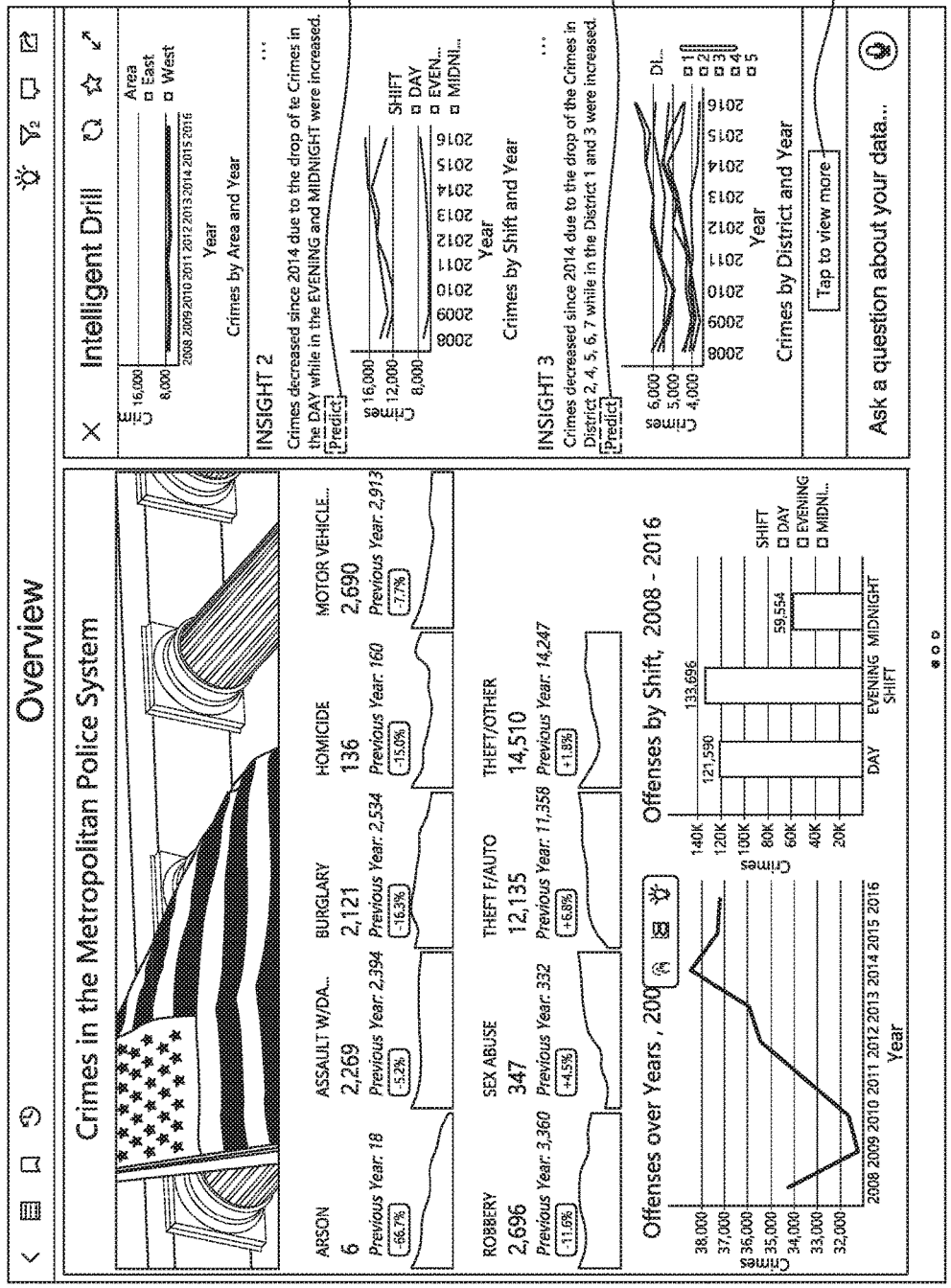

FIG. 4B depicts another view of user interface 400 showing additional features of intelligent drill interface 450. Two additional insight displays 452b, 452c are shown. Each is equipped with a "Predict" command 454b, 454c built into an insight. Upon selection of the "Predict" command, a menu 457 may appear and provide options for conditions under which to predict future data. A "View more" command 460 may allow for display of additional insight displays, should a user wish to see them.

Figure 4C:
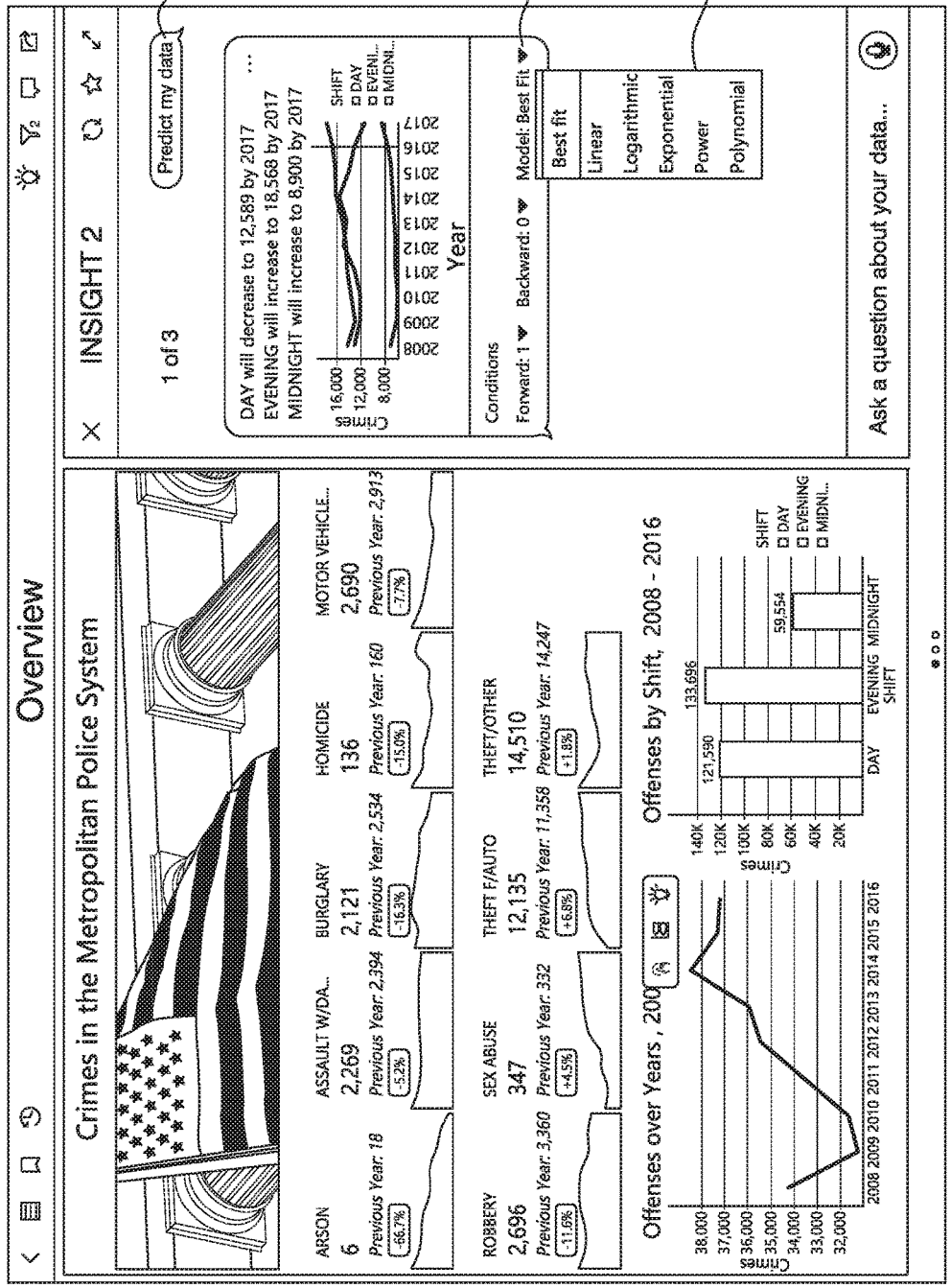

As shown in FIG. 4C, when the "Predict" command is selected and one or more conditions are set, an insight display 452d housing a prediction may be generated. The set conditions are included in a description 461 within insight display 452d, and in some embodiments, may be changed using a drop-down menu from insight display 452d. Changing the conditions may cause insight display 452d to self-update and reflect the changes, or alternatively may cause the creation of a further insight display.

Figure 4D:
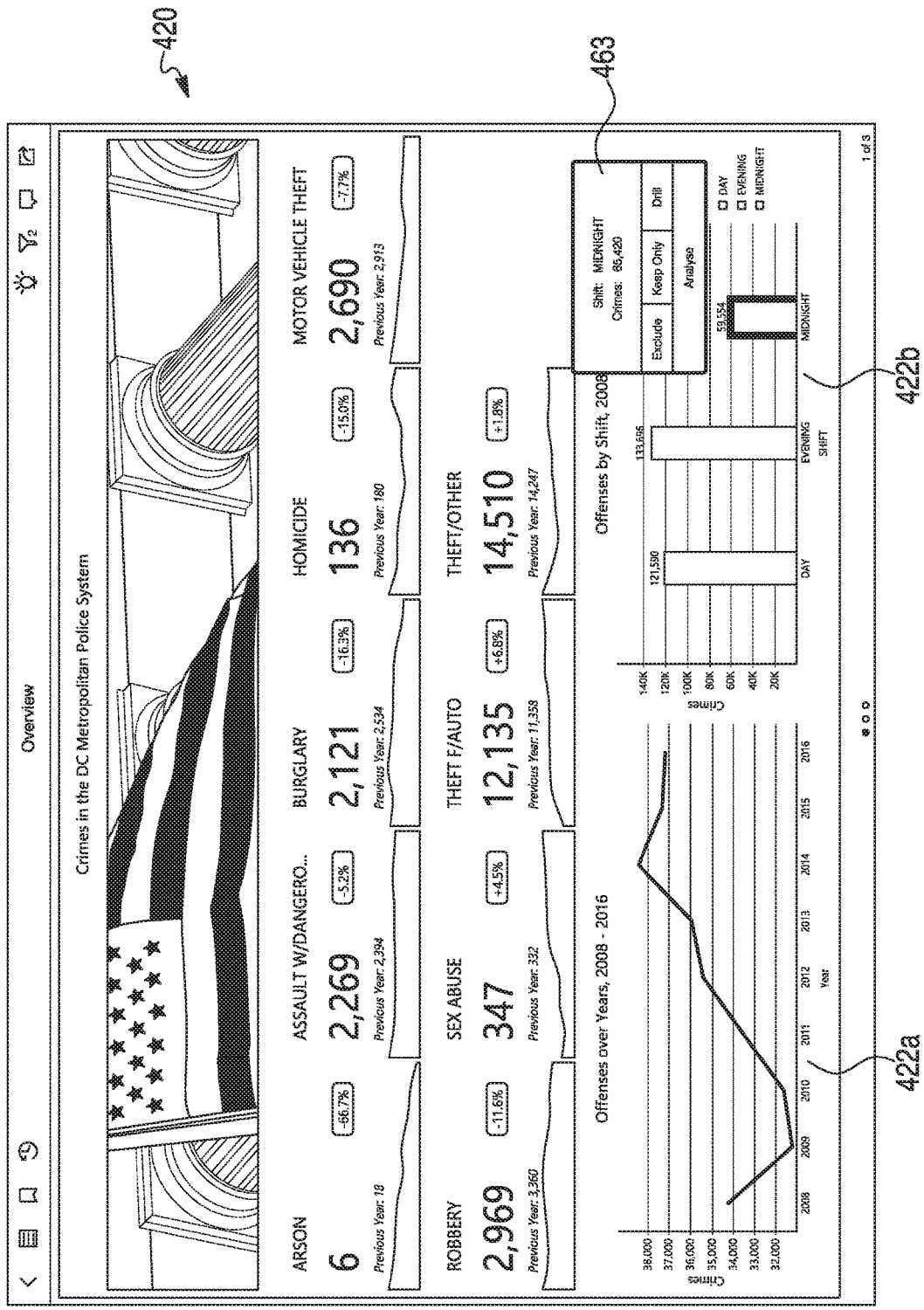
Figure 4E:
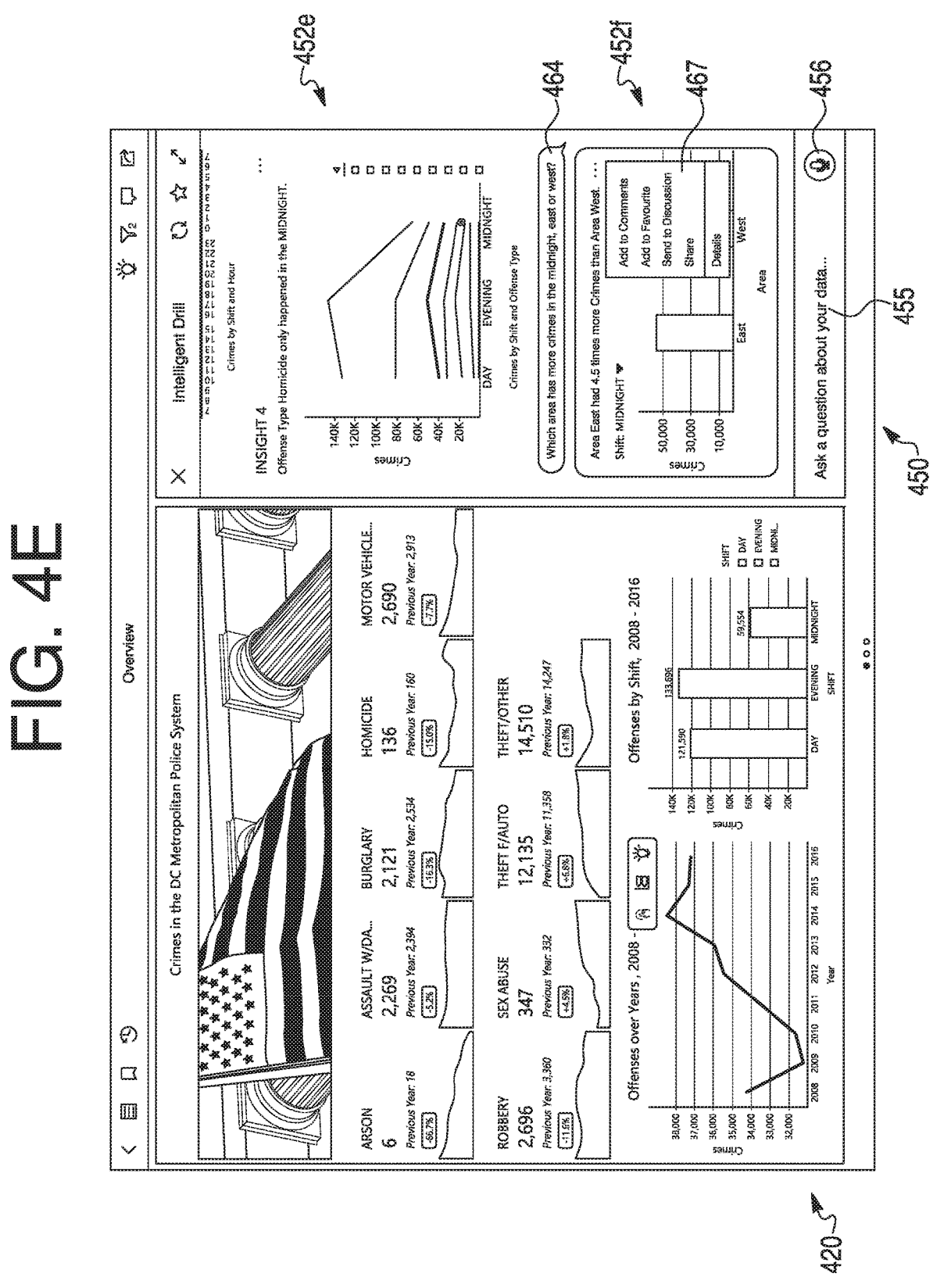

FIG. 4D depicts a view of primary visual interface 420. In this embodiment, additional interactivity between primary visual interface 420, the user, and intelligent drill display 450 are possible. For example, by hovering over, mousing over, tapping, or otherwise interacting with a subsection of a metric (e.g., a part of a bar graph), such as metric 422b, a user may prompt generation of a menu 463 of options for managing an intelligent drill process with respect that subsection. The menu may include commands to, e.g., exclude the subsection in question from an analysis process, keep only the subsection in question in the process, analyze the subsection in isolation, or "drill" or recursively analyze the subsection. Upon selection of one of these options, intelligent drill display 450 may appear, with tailored analyses, insights, and recommendations based on the selected option. As shown in FIG. 4E, upon a user selecting to analyze only the portion of metric 422b related to "midnight," insight display 452e directed only to data relating to "midnight" is generated. Previously-discussed functionalities may apply should a user wish to explore or drill further into insight display 452e or other insight displays. For example, a user may wish to ask a question 464 in natural language. A further insight display 452f may be generated in response to the question 464. Options to add an insight display to comments, add to favorites, save to a discussion, share with others, etc. may be available in a pop-up menu 467. Details regarding further insight display 452f may be appended to the display, for reference and clarity.

Figure 4F:
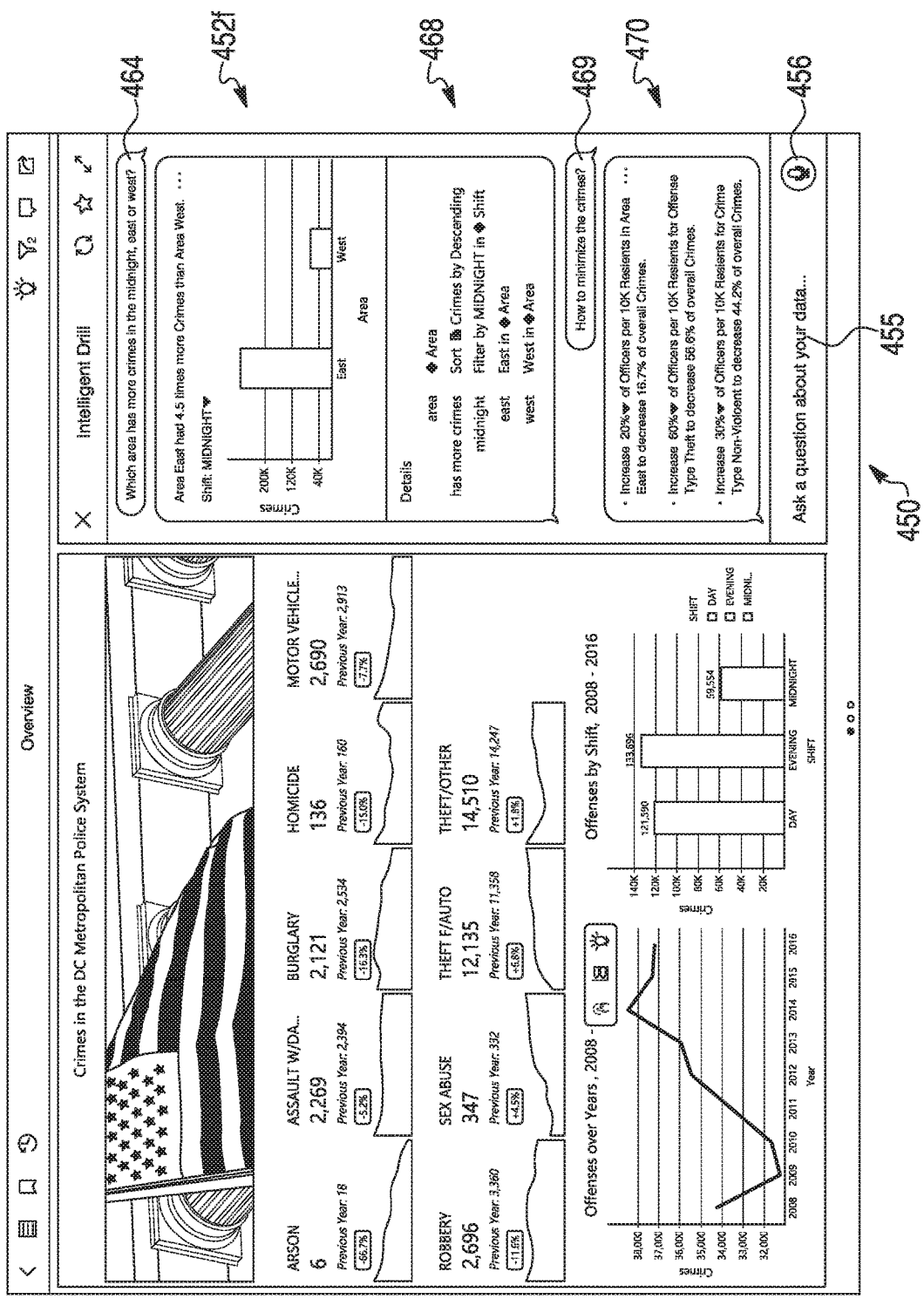

Finally, as shown in FIG. 4F, an additional functionality of user interface 400 may include the ability to display prescriptive analytics. Prescriptive analytics focus on finding a suitable or optimal course of action in a scenario given available data. In some embodiments, user interface 400 may allow for a user to ask a question in natural language, and in response, one or more aspects of a system infrastructure may provide information and suggested actions in response. For example, a user may ask a question 469 in natural language asking how to change or influence data collected in the future. An answer 470 may be provided based on predicting influencing factors (e.g., attributes, and "child" attributes) on data, and recommending changes to those factors.

Figure 5:
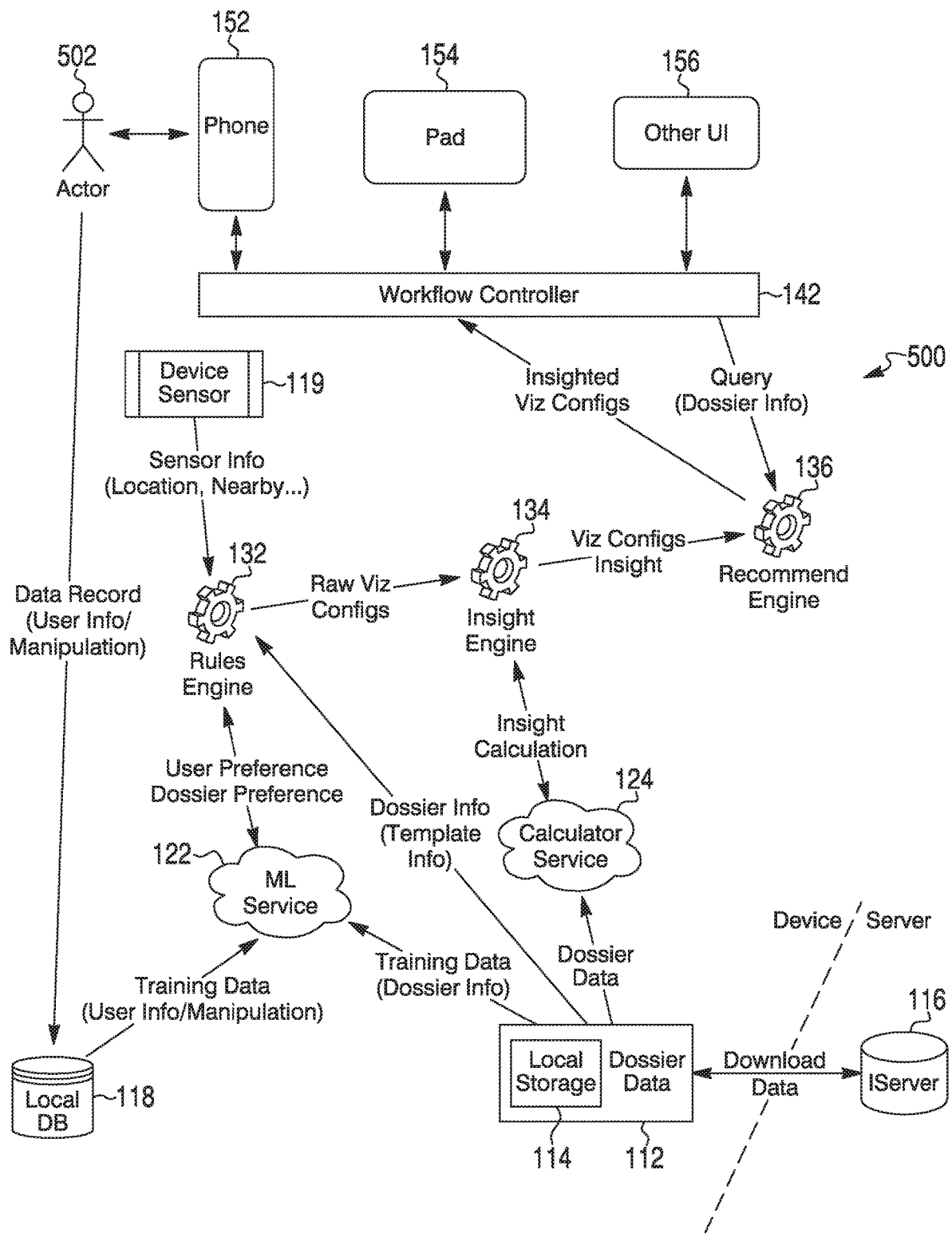
FIGS. 5 and 6 depict process flow diagrams of exemplary system infrastructures according to some embodiments of the present disclosure.
Figure 6:
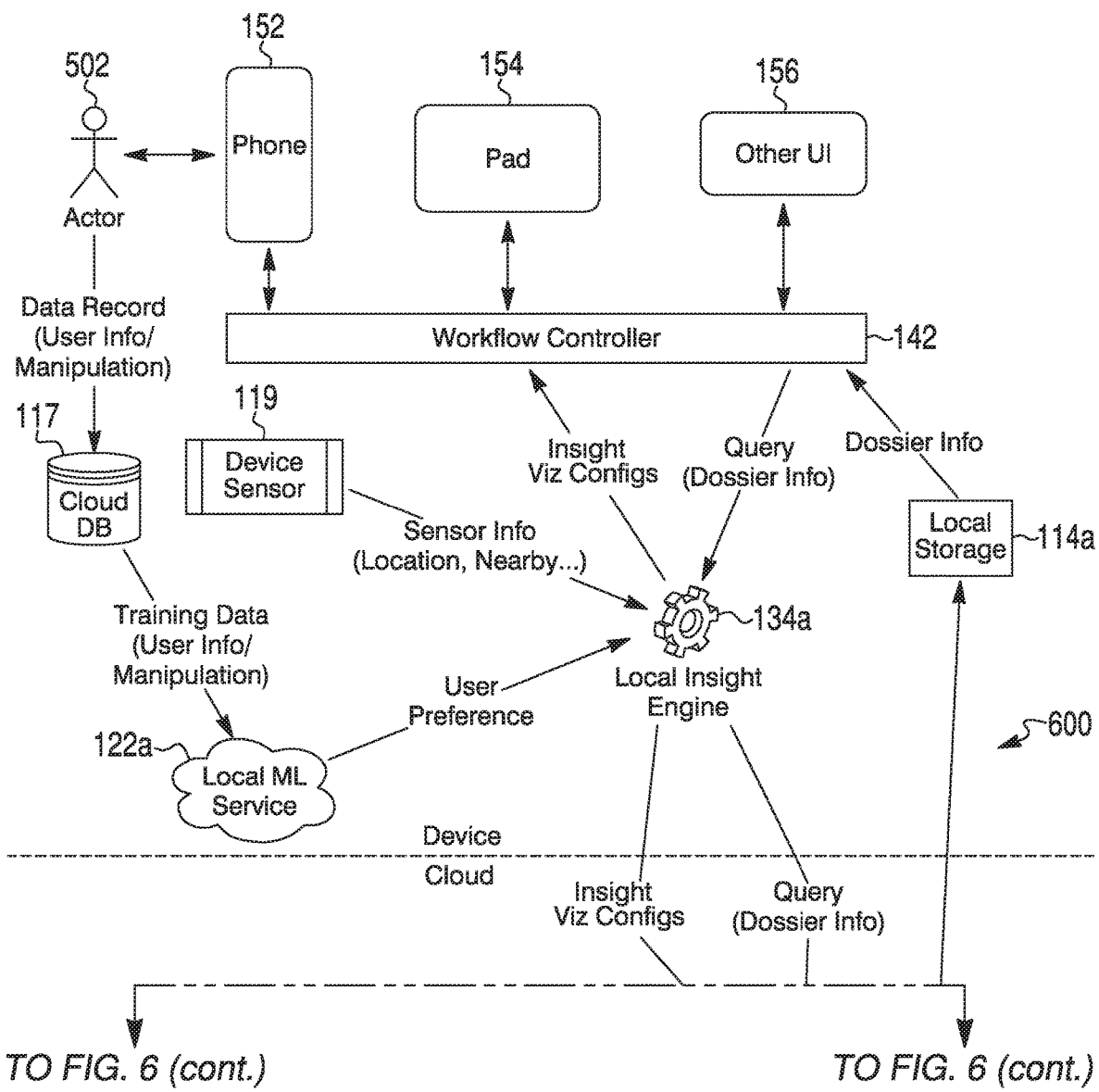
Figure 6:
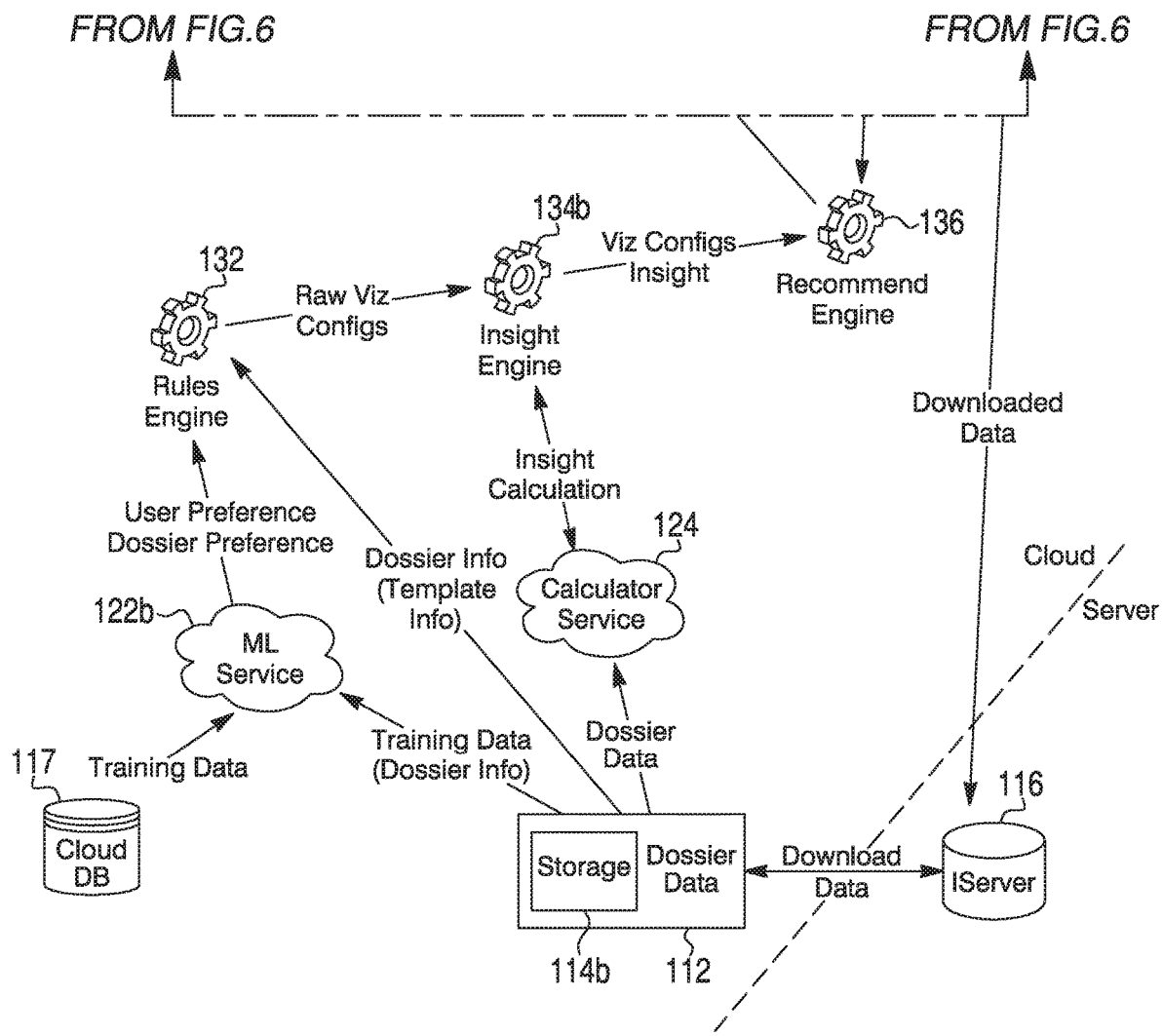

FIGS. 5 and 6 depict process flow diagrams of exemplary system infrastructures 500, 600 which may perform methods according to the present disclosure. Each system infrastructure 500, 600 shares elements with system infrastructure 100 depicted in FIG. 1, and thus, those elements will not be re-described in detail. System infrastructures 500, 600 are depicted to show exchanges of data, including information, instructions, inputs, outputs, and the like, between components of the systems (not all connections or communications between components are depicted). Moreover, system infrastructure 500 is an example of an infrastructure located primarily on a single device, whereas system infrastructure 600 is an example of a partially cloud-based infrastructure.

In system infrastructure 500, rules engine 132, insight engine 134, recommendation engine 136, machine learning service 122, calculator service 124, local database 118, local storage 114 for dossier data 112, and workflow controller 142 may all be located on a single device having a user interface, such as a phone 152, a pad 154, or other user interface 156. An actor (e.g., a user) 502 may be able to directly manipulate user preferences for system infrastructure 500 via making changes and updates to, e.g., local database 118. Local database 118 may provide, e.g., training data to machine learning service 122 (along with, optionally, training data from dossier 112). Actor 502 may therefore manipulate machine learning service 122 (and, therefore, in some embodiments, the operation of rules engine 132) to suit their particular needs or preferences. Server 116, which may house a portion of dossier 112, may be located remotely from other components of system infrastructure 500. In executing methods according to the present disclosure, system infrastructure 500 may download data as needed from server 116 to local storage 114. Rules engine 132, insight engine 134, and recommendation engine 136 may convey information to one another, and in particular may convey portions of a display output (including, e.g., displays of analyses, insights, and recommendations) towards workflow controller 142 for display on a user interface.

In contrast with system infrastructure 500, system infrastructure 600 is an example of a partially cloud-based infrastructure. Several elements of system infrastructure are divided into a local component and a cloud-based component, including local insight engine 134a/insight engine 134b, local machine learning service 122a/machine learning service 122b, and local storage 114a/storage 114b. The division of these components may allow for a device having, e.g., limited processing and storage capabilities to perform methods according to the present disclosure while relying partially on processing, storage capabilities, and potential security benefits of the cloud. Local components may allow for system infrastructure 600 to access (or access more easily) information related to a local device, such as user behavior and/or device location. Local insight engine 134a may prepare partial or entire insights using, e.g., data available locally to a user device, such as sensor information from the user device, user preferences, and dossier information downloaded to local storage 114a. Both local insight engine 134a and insight engine 134b may interface with, e.g., recommendation engine 136, and may merge insights based on locally-available data with insights based on cloud-based data to form insights for display on a user device.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of generating and displaying insights using repository data, the method comprising:
    receiving, at a processor, a request from a user to analyze a metric generated using data from a repository;
    accessing a semantic graph to determine a plurality of attributes for analyzing the metric;
    using the plurality of attributes associated with the data, creating a plurality of analyses of the metric, wherein each analysis includes a graph or chart, and each analysis of the plurality of analyses is based on at least one attribute;
    testing each analysis from the plurality of analyses for at least one of: a statistically significant trend, a pattern, or an outlier;
    selecting an analysis from the plurality of analyses based on the testing each analysis;
    generating an insight based on the selected analysis;
    based on the generated insight and the selected analysis, generating a plurality of recommended actions, the plurality of recommended actions including replacing a first attribute of the data used in the selected analysis with a child of the first attribute;
    outputting, to a user device, a display of the selected analysis, the generated insight, and the plurality of recommended actions;
    receiving, from the user device, an instruction to replace the first attribute with the child of the first attribute in response to the output display;
    based on the received instruction to replace the first attribute with the child of the first attribute, generating a further analysis, a further insight, and a plurality of further recommended actions that are based on the further analysis and the further insight; and
    outputting, to the user device, a display of the further analysis, the further insight, and the plurality of further recommended actions.

2. The method of claim 1, further comprising:
    recursively performing the steps of:
        receiving, from the user device, an instruction to take an action in response to the output display;
        based on the received instruction, generating an additional analysis, an additional insight, and a plurality of additional recommended actions that are based on the further analysis and the further insight; and
        outputting, to the user device, a display of the additional analysis, the additional insight, and the plurality of additional recommended actions.

3. The method of claim 1, wherein the step of outputting, to the user device, the display of the further analysis, the further insight, and the plurality of further recommended actions comprises updating a previously output display of the selected analysis, the generated insight, and the plurality of recommended actions.

4. The method of claim 1, wherein the received instruction to take an action in response to the output display includes one of:
    a selection of a recommended action; or
    an instruction input into a user device in spoken or written natural language.

5. The method of claim 1, wherein each of the plurality of attributes that describe the data includes a categorization or value assigned to data points in the data, wherein the categorization or value is not reflected in the metric.

6. The method of claim 1, further comprising:
    using repository data and/or user preference data, training a machine learning model to choose attributes suitable for creating an analysis of a metric; and
    using the trained machine learning model to choose the plurality of attributes for creating the plurality of analyses of the metric.

7. The method of claim 1, wherein the step of generating a plurality of recommended actions comprises:
    accessing a database of potential recommended actions and conditions for recommending each potential recommended action, wherein the potential recommended actions are assigned a priority order;
    identifying whether the conditions for recommending each potential recommended action have been met; and
    selecting a predetermined number of potential recommended actions for which the conditions have been met.

8. The method of claim 1, further comprising:
    receiving, from a user device, an instruction to add a generated insight to a primary visual interface; and
    adding the generated insight to the primary visual interface.

9. The method of claim 1, further comprising:
    receiving, from a user device, a request to share a generated insight; and
    creating a copy of the generated insight for attachment to a digital message.

10. A method of generating and displaying insights using repository data, the method comprising:
    receiving, at a processor from a user device, a request to analyze a metric generated using data from a repository;
    accessing a semantic graph to determine a plurality of attributes for analyzing the metric;

using the plurality of attributes that describe the data, creating a plurality of analyses of the metric, wherein each analysis includes a ranked list or map, and each analysis of the plurality of analyses is based on at least one attribute;

reviewing the generated analyses to select a predetermined number of analyses, each of which (1) shows an outlier, a pattern, or a trend, or (2) is based on an attribute of interest to a user;

generating an insight based on each selected analysis;

for each of the generated insights, generating a plurality of recommended actions, the plurality of recommended actions including replacing a first attribute of the data used in the selected analysis with a child of the first attribute;

outputting, to the user device, an interactive display including each selected analysis, the insight generated based on each selected analysis, and the plurality of recommended actions generated for each insight;

receiving, from the user device, an instruction to replace the first attribute with the child of the first attribute in response to the output display;

based on the received instruction to replace the first attribute with the child of the first attribute, generating a further analysis, a further insight, and a plurality of further recommended actions that are based on the further analysis and the further insight; and outputting, to the user device, an updated interactive display including the further analysis, the further insight, and the plurality of further recommended actions.

11. The method of claim 10, wherein the step of receiving, from the user device, an instruction to take an action in response to the interactive display includes receiving, from a user device, text input by a user, and wherein the method further comprises:

analyzing the text to identify a query or command; and performing an action in response to the query or command.

12. The method of claim 11, wherein the action includes one of:

generating an additional analysis or insight;

comparing two or more analyses; or outputting an answer to a question.

13. The method of claim 10, wherein each generated insight is a summary of a conclusion based on an analysis, and wherein the step of generating an insight based on each selected analysis includes:

identifying whether the analysis includes an outlier;

identifying whether the analysis exhibits a pattern; or identifying whether the analysis exhibits a trend in data over time.

14. The method of claim 10, further comprising:

receiving an instruction to make a prediction based on an analysis;

identifying a trend over time exhibited by the analysis; and predicting a future data point using the identified trend over time.

15. The method of claim 14, further comprising:

receiving an instruction to output a suggested method for changing a predicted future data point;

identifying one or more attributes which, if altered, would change the predicted future data point; and outputting, to the user device, a suggestion to alter the one or more attributes.

16. A system comprising:

one or more processors; and one or more computer-readable media comprising instructions that, when executed by the one or more processors, cause the one or more processors to perform operations for generating and displaying insights using repository data, the operations comprising:

in response to a user request to analyze a metric generated using data from a repository, identifying a plurality of attributes that describe the data based on accessing a semantic graph to determine the plurality of attributes for analyzing the metric;

creating a plurality of analyses of the metric, wherein each analysis includes an organizational format to at least one of sort, evaluate, or categorize data, and each analysis of the plurality of analyses is based on at least one attribute;

selecting a predetermined number of the created analyses, each of which (1) shows an outlier, a pattern, or a trend, or (2) is based on an attribute of interest to a user;

generating an insight based on each selected analysis, wherein the insight summarizes a conclusion based on the analysis;

for each generated insight, generating a plurality of recommended actions using the processor, the plurality of recommended actions including replacing a first attribute of the data used in the selected analysis with a child of the first attribute;

outputting, to a user device, an interactive display including each selected analysis, the insight generated based on each selected analysis, and the plurality of recommended actions generated for each insight;

receiving, from the user device, an instruction to replace the first attribute with the child of the first attribute in response to the output display;

based on the received instruction to replace the first attribute with the child of the first attribute, generating a further analysis, a further insight, and a plurality of further recommended actions that are based on the further analysis and the further insight; and outputting, to the user device, a display of the further analysis, the further insight, and the plurality of further recommended actions.

17. The system of claim 16, wherein the operations further comprise:

receiving, from the user device, an instruction to take an action in response to the interactive display;

based on the received instruction, generating, using the processor, a further analysis, a further insight, and a plurality of further recommended actions that are based on the further analysis and the further insight; and outputting, to the user device, an updated interactive display including the further analysis, the further insight, and the plurality of further recommended actions.

18. The system of claim 16, wherein the operation of identifying a plurality of attributes that describe the data is performed by a rules engine using a semantic graph.

19. The system of claim 18, wherein the rules engine is located in a network cloud, remotely from the user device.

20. The system of claim 16, wherein the operations of selecting a predetermined number of the created analyses and generating an insight based on each selected analysis are performed by a combination of a first insight engine local to a user device and a second insight engine located remotely from the user device.

\* \* \* \* \*